(12) United States Patent
Liu et al.

(10) Patent No.: US 12,555,183 B2
(45) Date of Patent: Feb. 17, 2026

(54) SYSTEM AND METHOD FOR PROVIDING SPATIOTEMPORAL VISUAL GUIDANCE WITHIN 360-DEGREE VIDEO

(71) Applicant: Meta Platforms Technologies, LLC, Menlo Park, CA (US)

(72) Inventors: Sean Liu, Toronto (CA); Rorik Henrikson, Toronto (CA); Mark Parent, Toronto (CA); Michael Glueck, Toronto (CA); Tovi Grossman, Toronto (CA)

(73) Assignee: Meta Platforms Technologies, LLC, Menlo Park, CA (US)

(*) Notice: Subject to any disclaimer, the term of this patent is extended or adjusted under 35 U.S.C. 154(b) by 332 days.

(21) Appl. No.: 18/162,171

(22) Filed: Jan. 31, 2023

(65) Prior Publication Data

US 2024/0095877 A1    Mar. 21, 2024

Related U.S. Application Data

(60) Provisional application No. 63/375,600, filed on Sep. 14, 2022.

(51) Int. Cl.
*G06T 3/16* (2024.01)
*G06T 19/00* (2011.01)
(Continued)

(52) U.S. Cl.
CPC .............. *G06T 3/16* (2024.01); *G06T 19/006* (2013.01); *G06V 10/25* (2022.01); *G06V 20/20* (2022.01); *G06V 20/44* (2022.01)

(58) Field of Classification Search
CPC ......... G06T 3/16; G06T 19/006; G06V 10/25; G06V 20/20; G06V 20/44
See application file for complete search history.

(56) References Cited

U.S. PATENT DOCUMENTS

2020/0053351 A1*  2/2020  Han ................. H04N 21/42204
2020/0382755 A1* 12/2020  DiVerdi ............... H04N 13/282

OTHER PUBLICATIONS

Alcove VR, "360 3D Marseille, France—Guided Tour—Virtual Travel 4K (Full series on Alcove for Quest)," Youtube, Apr. 19, 2022, 1 page, Retrieved from the Internet: URL: https://www.youtube.com/watch?v=gURIhqukTSQ.

(Continued)

*Primary Examiner* — Said Broome
*Assistant Examiner* — Andrew Shin
(74) *Attorney, Agent, or Firm* — Morgan, Lewis & Bockius LLP

(57) ABSTRACT

Features described herein generally relate to providing spatiotemporal guidance within a 360-degree video. Particularly, while a 360-degree video is being displayed to a user, a current location of the view of the user within the 360-degree video is determined. Additionally, regions of interest may be identified within the 360-degree video, along with their location and a time in which the regions of interest are active within the 360-degree video. A visual guide is then overlaid onto the 360-degree video that indicates a current location of the view of the user, as well as locations of one or more regions of interest, as well as the time during which each region of interest is active (able to be viewed) within the 360-degree video. By viewing the visual guide, the user may be able to anticipate a location and timing of regions of interest within the 360-degree video and adjust their gaze to the correct location at the correct time to view such regions of interest.

20 Claims, 16 Drawing Sheets

(51) Int. Cl.
G06V 10/25 (2022.01)
G06V 20/20 (2022.01)
G06V 20/40 (2022.01)

(56) References Cited

OTHER PUBLICATIONS

Baudisch P., et al., "Halo: A Technique for Visualizing Off-Screen Objects," CHI 03: Proceedings of the SIGCHI Conference on Human Factors in Computing Systems, Apr. 5, 2003, vol. 05, No. 01, pp. 481-488.
Beat Games, "Beat Saber", 2018, Available online at https://beatsaber.com, 18 pages.
Brillhart J., "In the Blink of a Mind—Attention," The Language of VR, Feb. 5, 2016, 12 pages, Retrieved from the Internet: URL: https://medium.com/the-language-of-vr/in-the-blink-of-a-mind-attention-1fdff60fa045.
Bruder G., et al., "Tuning Self-Motion Perception in Virtual Reality with Visual Illusions," IEEE Transactions on Visualization and Computer Graphics, Jul. 2012, vol. 18, No. 07, pp. 1068-1078.
Cao C., et al., "Automatic Generation of Diegetic Guidance in Cinematic Virtual Reality," 2020 IEEE International Symposium on Mixed and Augmented Reality (ISMAR), Nov. 9, 2020, pp. 600-607.
Grogorick S., et al., "Comparing Unobtrusive Gaze Guiding Stimuli in Head-Mounted Displays," 2018 IEEE International Conference on Image Processing (ICIP), Oct. 7, 2018, pp. 2805-2809.
Grogorick S., et al., "Stereo Inverse Brightness Modulation for Guidance in Dynamic Panorama Videos in Virtual Reality," Computer Graphics Forum, Aug. 29, 2020, vol. 39, No. 06, 12 pages.
Gustafson S., et al., "Wedge: Clutter-Free Visualization of Off-Screen Locations," CHI 08: Proceedings of the SIGCHI Conference on Human Factors in Computing Systems, Apr. 5, 2008, pp. 787-796.
Harmonix, "Guitar Hero (Video Game)," Wikipedia, Nov. 8, 2005, 10 pages.
Hart S.G., et al., "Development of NASA-TLX (Task Load Index): Results of Empirical and Theoretical Research," Human Mental Workload, 1988, vol. 52, pp. 139-183.
Kaul O.B., et al., "HapticHead: A Spherical Vibrotactile Grid around the Head for 3D Guidance in Virtual and Augmented Reality," CHI 17: Proceedings of the 2017 CHI Conference on Human Factors in Computing Systems, May 6, 2017, pp. 3729-3740.
Kinnunen J., "Spatial Guiding through Haptic Cues in Omnidirectional Video," Master's Thesis University of Tampere, Jun. 2018, 56 pages.
Konami, "Dance Dance Revolution", 1998, 1 page, Available online at: https://www.youtube.com/watch?v=K2IammLWeNE, 1 page.
"Renderheads," AVPro Video, 2022, 1 page, Retrieved from the Internet: https://www.renderheads.com/content/docs/AVProVideo/articles/intro.html.
Li J., et al., "Route Tapestries: Navigating 360 Virtual Tour Videos Using Slit-Scan Visualizations," UIST 21: The 34th Annual ACM Symposium on User Interface Software and Technology, Oct. 12, 2021, pp. 223-238.
Lilija K., et al., "Who Put That There? Temporal Navigation of Spatial Recordings by Direct Manipulation," CHI 20: Proceedings of the 2020 CHI Conference on Human Factors in Computing Systems, Apr. 25-30, 2020, 11 pages.
Lin Y-C., et al., "Tell Me Where to Look: Investigating Ways for Assisting Focus in 360° Video," CHI 17: Proceedings of the 2017 CHI Conference on Human Factors in Computing Systems, May 6-11, 2017, pp. 2535-2545.
Lin Y-T., "Outside-In: Visualizing Out-of-Sight Regions-of-Interest in a 360° Video Using Spatial Picture-in-Picture Previews," UIST '17: Proceedings of the 30th Annual ACM Symposium on User Interface Software and Technology, Oct. 22-25, 2017, pp. 255-265.
Liu S.J., et al., "View-Dependent Video Textures for 360° Video," Proceedings of the 32nd Annual ACM Symposium on User Interface Software and Technology, Oct. 20-23, 2019, pp. 249-262.
Maranes C., et al., "Exploring The Impact Of 360 Movie Cuts In Users' Attention," IEEE Conference on Virtual Reality and 3D User Interfaces (VR), Mar. 22-26, 2020, pp. 73-82.
Maranes C., et al., "Towards Assisting The Decision-Making Process For Content Creators In Cinematic Virtual Reality Through The Analysis Of Movie Cuts And Their Influence On Viewers' Behavior," International Transactions in Operational Research, Jan. 6, 2022, pp. 1-18.
Masia B., et al., "Influence of Directional Sound Cues on Users' Exploration Across 360° Movie Cuts," IEEE Computer Graphics and Applications, Mar. 11, 2021, vol. 41, No. 4, 14 pages.
McCrae J., et al., "Exploring the Design Space of Multiscale 3D Orientation," In Proceedings of the International Conference on Advanced Visual Interfaces., May 26, 2010, pp. 81-88.
McCrae J., et al., "Multiscale 3D Navigation," Proceedings of the 2009 symposium on Interactive 3D graphics and games, Feb. 27, 2009, pp. 7-14.
National Geographic, "Elephant Encounter in 360—Ep. 2 The Okavango Experience," Youtube, Dec. 18, 2018, 2 pages, Retrieved from the Internet: URL: https://www.youtube.com/watch?v=HI7mTlxNotQ.
Nguyen C., et al., "Vremiere: In-Headset Virtual Reality Video Editing," Proceedings of the 2017 CHI Conference on Human Factors in Computing Systems, May 6-11, 2017, pp. 5428-5438.
Nielsen L. T., et al., ". Missing the Point: An Exploration of How to Guide Users' Attention during Cinematic Virtual Reality," In Proceedings of the 22nd ACM Conference on Virtual Reality Software and Technology, Nov. 2, 2016, pp. 229-232.
Pavel A., et al., "Shot Orientation Controls for Interactive Cinematography with 360 Video," Proceedings of the 30th Annual ACM Symposium on User Interface Software and Technology, 2017, pp. 289-297.
Rockstar, "Grand Theft Auto IV", PlayStation 3, Apr. 29, 2008, 3 pages.
Rothe S., et al., "GazeRecall: Using Gaze Direction to Increase Recall of Details in Cinematic Virtual Reality," In Proceedings of the 17th International Conference on Mobile and Ubiquitous Multimedia, Nov. 25, 2018, pp. 115-119.
Rothe S., et al., "Guidance in Cinematic Virtual Reality-Taxonomy, Research Status and Challenges," Multimodal Technologies and Interaction, Mar. 19, 2019, 23 pages.
Rothe S., et al., "Guiding The Viewer In Cinematic Virtual Reality By Diegetic Cues," In 5 th International Conference on AVR 2018: Augmented Reality, Virtual Reality and Computer Graphics, Jun. 24-27, 2018, 18 pages.
School of Rock the Musical, "School of Rock: The Musical—"You're in the Band" (360 Video)," Youtube, Oct. 14, 2015, 1 page, Retrieved from the Internet: URL: https://www.youtube.com/watch?v=GFRPXRhBYOl.
Serrano A., et al., "Movie Editing and Cognitive Event Segmentation in Virtual Reality Video," ACM Transactions on Graphics, vol. 36, No. 4, Article 47, 2017, pp. 47:1-47:12.
Sheikh A., et al., "Directing Attention In 360-Degree Video," IBC 2016 Conference, Sep. 8-12, 2016, 9 pages.
Shirazi S., "Timeline Visualization Of Omnidirectional Videos," Master's thesis, May 2018, 52 pages.
Sitzmann V., et al., "How Do People Explore Virtual Environments?," arXiv: 1612.04335v2, Sep. 19, 2017, 10 pages.
Speicher M., et al., "Exploring Visual Guidance In 360-Degree Videos," In Proceedings of the 2019 ACM International Conference on Interactive Experiences for TV and Online Video, Jun. 4, 2019, pp. 1-12.
Wallgrun J.O., et al., "A Comparison Of Visual Attention Guiding Approaches For 360 Image-Based VR Tours," In 2020 IEEE Conference on Virtual Reality and 3D User Interfaces (VR) IEEE Annual International Symposium Virtual Reality, Mar. 22-26, 2020, pp. 83-91.
Wikipedia, "Call of Duty 4: Modern Warfare," Activision, Nov. 5, 2007, 19 pages.

(56) References Cited

OTHER PUBLICATIONS

Woolwson R.F., "Wilcoxon Signed-Rank Test," Wiley Encyclopedia of Clinical Trials, Mar. 9, 2007, pp. 1-3.
Youtube, "360 Google Spotlight Stories: HELP," Google Spotlight Stories, Apr. 18, 2016, 2 pages, Retrieved from the Internet: URL: https://www.youtube.com/watch?v=G-XZhKqQAHU.
Youtube, "Pokemon 360—Catch Em All in VR1!," Indie Film School, Sep. 13, 2016, 1 page, Retrieved from the Internet: URL: https://www.youtube.com/watch?v=pHUVS_GrleM.

* cited by examiner

SYSTEM AND METHOD FOR PROVIDING SPATIOTEMPORAL VISUAL GUIDANCE WITHIN 360-DEGREE VIDEO

CROSS-REFERENCE TO RELATED APPLICATIONS

The present disclosure claims priority to U.S. Provisional Application Ser. No. 63/375,600 for "Spatiotemporal Visual Guidance For 360-Degree Video," filed Sep. 14, 2022, which is incorporated by reference herein in its entirety.

FIELD

The present disclosure generally relates to 360-degree videos in an extended reality environment, and more particularly, to techniques for spatiotemporal visual guidance (i.e., when an important event is going to happen) for 360-degree video.

BACKGROUND

Extended reality (XR) is a form of reality that has been adjusted in some manner before presentation to a user, which may include, e.g., a virtual reality (VR), an augmented reality (AR), a mixed reality (MR), a hybrid reality, or some combination and/or derivatives thereof. Extended reality content may include completely generated virtual content or generated virtual content combined with physical content (e.g., physical or real-world objects). The extended reality content may include digital images or animation, text, video, audio, haptic feedback, or some combination thereof, and any of which may be presented in a single channel or in multiple channels (such as stereo video that produces a three-dimensional effect to the viewer). Extended reality may be associated with applications, products, accessories, services, or some combination thereof, that are, e.g., used to create content in an extended reality and/or used in (e.g., perform activities in) an extended reality. The extended reality system that provides such content may be implemented on various platforms, including a head-mounted display (HMD) connected to a host computer system, a standalone HMD, a mobile device or computing system, or any other hardware platform capable of providing extended reality content to one or more users.

360-degree videos, also known as 360-video, surround video, immersive videos, or spherical videos, are video recordings where a view in every direction is recorded at the same time, shot using an omnidirectional camera or a collection of cameras. The 360-degree videos place the observer in the center of the scene and creates a fully immersive environment. 360-degree videos are typically viewed via personal computers, mobile devices such as smartphones, or HM Ds. Users can pan around the video by clicking and dragging. On smartphones, internal sensors such as the gyroscope can also be used to pan the video based on the orientation of the device. Taking advantage of this behavior, stereoscope-style enclosures for smartphones (such as Google Cardboard viewers and the Samsung Gear VR) can be used to view 360-degree videos in an immersive format similar to virtual reality. The phone display is viewed through lenses contained within the enclosure, as opposed to virtual reality headsets that contain their own dedicated displays. The 360-degree videos can also be viewed through a dedicated HM D to provide fully immersive real and/or virtual content. Users can look in every direction to view the content, allowing for 360 degrees of view.

BRIEF SUMMARY

Embodiments described herein pertain to a system and method for providing spatiotemporal visual guidance within 360-degree video.

In some implementations, an extended reality system is provided that includes a head-mounted device that has a display for displaying content to a user and one or more sensors to capture input data; one or more processors; and one or more memories that are accessible to the one or more processors and that store instructions that are executable by the one or more processors and, when executed by the one or more processors, cause the one or more processors to perform processing including identifying a location of a region of interest (ROI) within a 360-degree video; identifying a time during which the region of interest is active within the 360-degree video; generating a visual guide, the visual guide indicating a location of the region of interest within the 360-degree video with respect to a user's current view, and the time during which the region of interest is active within the 360-degree video; and rendering the visual guide in the display.

In some implementations, the visual guide includes a first shape representing the user, and the first shape aligns with the user's current view. In other implementations, the visual guide includes a second shape representing the region of interest, wherein a distance of the second shape from the first shape corresponds to a difference between a current time in the 360-degree video and a time in which the region of interest is active. In other implementations, the location of the region of interest with respect to the user's current view corresponds to an angular location of the geometric wedge with respect to the central object, and the time during which the region of interest is active within the 360-degree video corresponds to a distance of the geometric wedge from a center of the central object, wherein a decrease in the distance between the geometric wedge and the center of the central object signifies a decrease in a time until the region of interest is active within the 360-degree video.

Some implementations of the present disclosure include a system including one or more data processors and a non-transitory computer readable storage medium containing instructions which, when executed on the one or more data processors, cause the one or more data processors to perform part or all of one or more methods and/or part or all of one or more processes disclosed herein.

Some implementations of the present disclosure also include one or more non-transitory computer-readable media storing computer-readable instructions that, when executed by one or more processing systems, cause the one or more processing systems to perform part or all of one or more methods and/or part or all of one or more processes disclosed herein.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION

Figure 1:
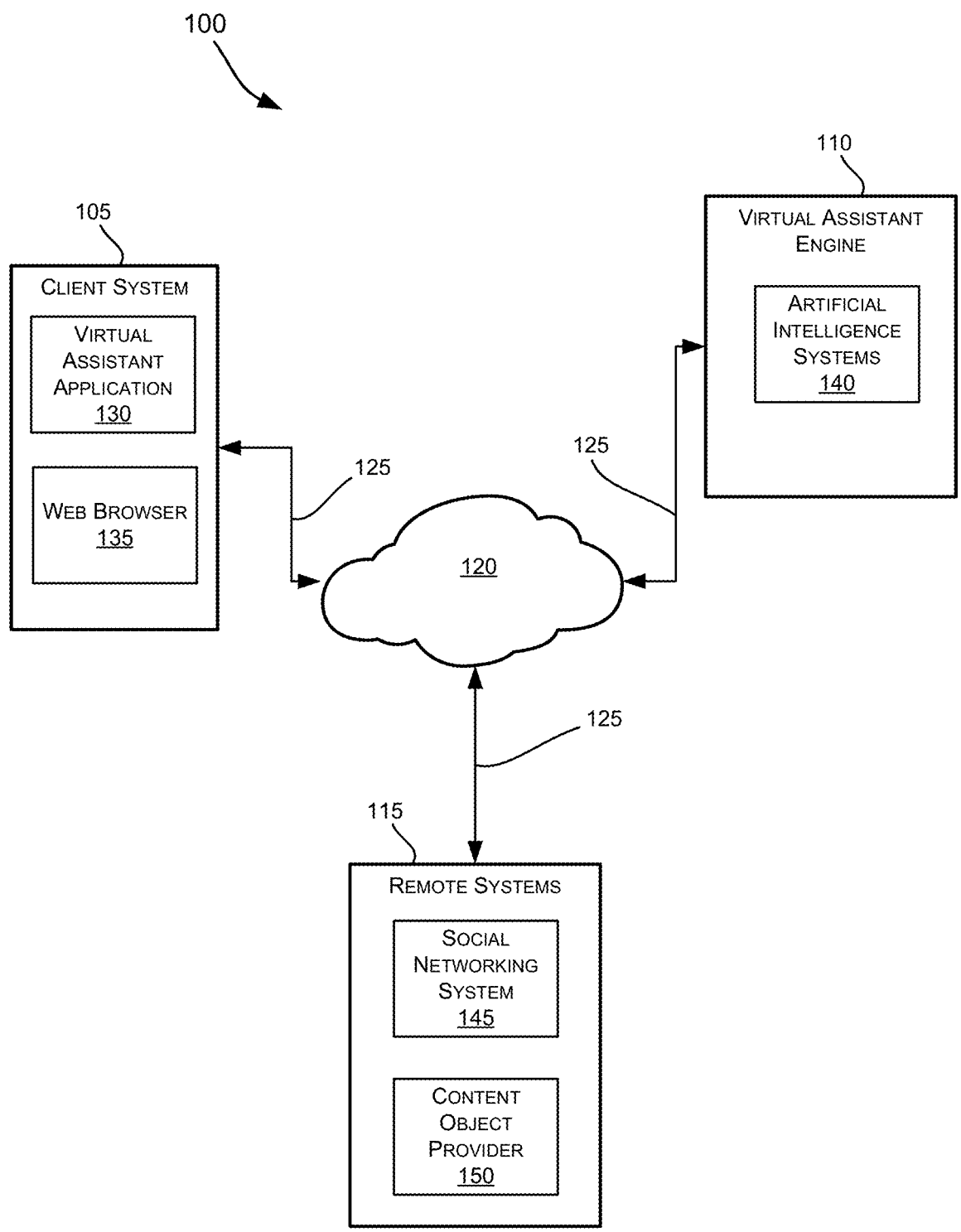
FIG. 1 is a simplified block diagram of a network environment in accordance with various embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

INTRODUCTION

Extended reality systems are becoming increasingly ubiquitous with applications in many fields, such as computer gaming, health and safety, industrial, and education. As a few examples, extended reality systems are being incorporated into mobile devices, gaming consoles, personal computers, movie theaters, and theme parks. Typical extended reality systems include one or more devices for rendering and displaying content to users. As one example, an extended reality system may incorporate a head-mounted device (HMD) worn by a user and configured to output extended reality content to the user. The extended reality content may be generated in a wholly or partially simulated environment (extended reality environment) that people sense and/or interact with via an electronic system. The simulated environment may be a virtual reality (VR) environment, which is designed to be based entirely on computer-generated sensory inputs (e.g., virtual content) for one or more user senses, or a mixed reality (MR) environment, which is designed to incorporate sensory inputs (e.g., a view of the physical surroundings) from the physical environment, or a representation thereof, in addition to including computer-generated sensory inputs (e.g., virtual content). Examples of MR include augmented reality (AR) and augmented virtuality (AV). An AR environment is a simulated environment in which one or more virtual objects are superimposed over a physical environment, or a representation thereof, or a simulated environment in which a representation of a physical environment is transformed by computer-generated sensory information. An AV environment is a simulated environment in which a virtual or computer-generated environment incorporates one or more sensory inputs from the physical environment. In any instance, during operation in a VR, MR, AR, or AV environment, the user typically interacts with and within the extended reality system to interact with extended reality content.

Extended reality systems can be used to facilitate interactions amongst users and objects within the virtual and/or physical world. One type of media used to facilitate these interactions is the 360-degree videos. 360-degree videos offer an immersive experience with their wide field of view; however, viewers can only see a limited portion of that view at any given point in time. As a result, viewers may miss important story or content elements. While there has been existing work in spatial guidance (where to look) to redirect the viewer's attention, there has been little to no work in temporal guidance (when to look).

In order overcome these challenges and others, the technique of spatiotemporal visual guidance was developed, and a new widget was created to implement spatiotemporal visual guidance within XR. While a 360-degree video is being displayed to a user, a user's current view within the 360-degree video is determined. Additionally, regions of interest may be identified within the 360-degree video, along with their location and a time in which the regions of interest are active within the 360-degree video. A visual guide is then overlaid onto the 360-degree video that indicates a current location of the user's view, as well as locations of one or more regions of interest, as well as the time during which each region of interest is active (able to be viewed) within the 360-degree video. By viewing the visual guide, the viewer of the 360-degree video may be able to anticipate a location and timing of regions of interest within the 360-degree video and adjust their gaze to the correct location at the correct time to view such regions of interest.

In an exemplary embodiment, an extended reality system is provided comprising: a head-mounted device comprising a display to display content to a user, one or more sensors to capture input data; one or more processors; and one or more memories accessible to the one or more processors, the one or more memories storing a plurality of instructions executable by the one or more processors, the plurality of instructions comprising instructions that when executed by the one or more processors cause the one or more processors to perform processing comprising: identifying a location of a region of interest (ROI) within a 360-degree video; identifying a time during which the region of interest is active within the 360-degree video; generating a visual guide, the visual guide indicating a location of the region of interest within the 360-degree video with respect to a user's current view, and the time during which the region of interest is active within the 360-degree video; and rendering the visual guide in the display.

Extended Reality System Overview

FIG. 1 illustrates an example network environment 100 associated with an extended reality system in accordance with aspects of the present disclosure. Network environment 100 includes a client system 105, a virtual assistant engine 110, and remote systems 115 connected to each other by a network 120. Although FIG. 1 illustrates a particular arrangement of the client system 105, the virtual assistant engine 110, the remote systems 115, and the network 120, this disclosure contemplates any suitable arrangement. As an example, and not by way of limitation, two or more of the client system 105, the virtual assistant engine 110, and the remote systems 115 may be connected to each other directly, bypassing the network 120. As another example, two or more of the client system 105, the virtual assistant engine 110, and the remote systems 115 may be physically or logically co-located with each other in whole or in part. Moreover, although FIG. 1 illustrates a particular number of the client system 105, the virtual assistant engine 110, the remote systems 115, and the network 120, this disclosure contemplates any suitable number of client systems 105, virtual assistant engine 110, remote systems 115, and networks 120. As an example, and not by way of limitation, network environment 100 may include multiple client systems, such as client system 105; virtual assistant engines, such as virtual assistant engine 110; remote systems, such as remote systems 115; and networks, such as network 120.

This disclosure contemplates that network 120 may be any suitable network. As an example, and not by way of limitation, one or more portions of a network 120 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Additionally, the network 120 may include one or more networks.

Links 125 may connect the client system 105, the virtual assistant engine 110, and the remote systems 115 to the network 120, to another communication network (not shown), or to each other. This disclosure contemplates links 125 may include any number and type of suitable links. In particular embodiments, one or more of the links 125 include one or more wireline links (e.g., Digital Subscriber Line or Data Over Cable Service Interface Specification), wireless links (e.g., Wi-Fi or Worldwide Interoperability for Microwave Access), or optical links (e.g., Synchronous Optical Network or Synchronous Digital Hierarchy). In particular embodiments, each link of the links 125 includes an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 125, or a combination of two or more such links. Links 125 need not necessarily be the same throughout a network environment 100. For example, some links of the links 125 may differ in one or more respects from some other links of the links 125.

In various embodiments, the client system 105 is an electronic device including hardware, software, or embedded logic components or a combination of two or more such components and capable of carrying out the appropriate extended reality functionalities in accordance with techniques of the disclosure. As an example, and not by way of limitation, the client system 105 may include a desktop computer, notebook or laptop computer, netbook, a tablet computer, e-book reader, global positioning system (GPS) device, camera, personal digital assistant, handheld electronic device, cellular telephone, smartphone, a VR, MR, AR, or AV headset or HMD, any suitable electronic device capable of displaying extended reality content, or any suitable combination thereof. In particular embodiments, the client system 105 is a VR/AR HMD, such as described in detail with respect to FIG. 2. This disclosure contemplates any suitable client system 105 that is configured to generate and output extended reality content to the user. The client system 105 may enable its user to communicate with other users at other client systems.

In various embodiments, the client system 105 includes a virtual assistant application 130. The virtual assistant application 130 instantiates at least a portion of a virtual assistant, which can provide information or services to a user based on user input, contextual awareness (such as clues from the physical environment or clues from user behavior), and the capability to access information from a variety of online sources (such as weather conditions, traffic information, news, stock prices, user schedules, and/or retail prices). As used herein, when an action is "based on" something, this means the action is based at least in part on at least a part of the something. The user input may include text (e.g., online chat), especially in an instant messaging application or other applications, voice, eye-tracking, user motion, such as gestures or running, or a combination of them. The virtual assistant may perform concierge-type services (e.g., making dinner reservations, purchasing event tickets, making travel arrangements, and the like), provide information (e.g., reminders, information concerning an object in an environment, information concerning a task or interaction, answers to questions, training regarding a task or activity, and the like), provide goal assisted services (e.g., generating and implementing a recipe to cook a meal in a certain amount of time, implementing tasks to clean in a most efficient manner, generating and executing a construction plan including allocation of tasks to two or more workers, and the like), or combinations thereof. The virtual assistant may also perform management or data-handling tasks based on online information and events without user initiation or interaction. Examples of those tasks that may be performed by the virtual assistant may include schedule management (e.g., sending an alert to a dinner date to which a user is running late due to traffic conditions, updating schedules for both parties, and changing the restaurant reservation time). The virtual assistant may be enabled in an extended reality environment by a combination of the client system 105, the virtual assistant engine 110, application programming interfaces (APIs), and the proliferation of applications on user devices, such as the remote systems 115.

A user at the client system 105 may use the virtual assistant application 130 to interact with the virtual assistant engine 110. In some instances, the virtual assistant application 130 is a stand-alone application or integrated into another application, such as a social-networking application or another suitable application (e.g., an artificial simulation application). In some instances, the virtual assistant application 130 is integrated into the client system 105 (e.g., part of the operating system of the client system 105), an assistant hardware device, or any other suitable hardware devices. In some instances, the virtual assistant application 130 may be accessed via a web browser 135. In some instances, the virtual assistant application 130 passively listens to and watches interactions of the user in the real-world, and processes what it hears and sees (e.g., explicit input, such as audio commands or interface commands, contextual awareness derived from audio or physical actions of the user, objects in the real-world, environmental triggers such as weather or time, and the like) in order to interact with the user in an intuitive manner.

In particular embodiments, the virtual assistant application 130 receives or obtains input from a user, the physical environment, a virtual reality environment, or a combination thereof via different modalities. As an example, and not by way of limitation, the modalities may include audio, text, image, video, motion, graphical or virtual user interfaces, orientation, and/or sensors. The virtual assistant application 130 communicates the input to the virtual assistant engine 110. Based on the input, the virtual assistant engine 110 analyzes the input and generates responses (e.g., text or audio responses, device commands, such as a signal to turn on a television, virtual content such as a virtual object, or the like) as output. The virtual assistant engine 110 may send the generated responses to the virtual assistant application 130, the client system 105, the remote systems 115, or a combination thereof. The virtual assistant application 130 may present the response to the user at the client system 105 (e.g., rendering virtual content overlaid on a real-world object within the display). The presented responses may be based on different modalities, such as audio, text, image, and video. As an example, and not by way of limitation, context concerning activity of a user in the physical world may be analyzed and determined to initiate an interaction for completing an immediate task or goal, which may include the virtual assistant application 130 retrieving traffic information (e.g., via remote systems 115). The virtual assistant application 130 may communicate the request for traffic information to virtual assistant engine 110. The virtual assistant engine 110 may accordingly contact a third-party system and retrieve traffic information as a result of the request and send the traffic information back to the virtual assistant application 110. The virtual assistant application 110 may then present the traffic information to the user as text (e.g., as virtual content overlaid on the physical environment, such as real-world object) or audio (e.g., spoken to the user in natural language through a speaker associated with the client system 105).

In some embodiments, the client system 105 may collect or otherwise be associated with data. In some embodiments, the data may be collected from or pertain to any suitable computing system or application (e.g., a social-networking system, other client systems, a third-party system, a messaging application, a photo-sharing application, a biometric data acquisition application, an artificial-reality application, a virtual assistant application).

In some embodiments, privacy settings (or "access settings") may be provided for the data. The privacy settings may be stored in any suitable manner (e.g., stored in an index on an authorization server). A privacy setting for the data may specify how the data or particular information associated with the data can be accessed, stored, or otherwise used (e.g., viewed, shared, modified, copied, executed, surfaced, or identified) within an application (e.g., an extended reality application). When the privacy settings for the data allow a particular user or other entity to access that the data, the data may be described as being "visible" with respect to that user or other entity. For example, a user of an extended reality application or virtual assistant application may specify privacy settings for a user profile page that identifies a set of users that may access the extended reality application or virtual assistant application information on the user profile page and excludes other users from accessing that information. As another example, an extended reality application or virtual assistant application may store privacy policies/guidelines. The privacy policies/guidelines may specify what information of users may be accessible by which entities and/or by which processes (e.g., internal research, advertising algorithms, machine-learning algorithms) to ensure only certain information of the user may be accessed by certain entities or processes.

In some embodiments, privacy settings for the data may specify a "blocked list" of users or other entities that should not be allowed to access certain information associated with the data. In some cases, the blocked list may include third-party entities. The blocked list may specify one or more users or entities for which the data is not visible.

In some embodiments, privacy settings associated with the data may specify any suitable granularity of permitted access or denial of access. As an example, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. In some embodiments, different pieces of the data of the same type associated with a user may have different privacy settings. In addition, one or more default privacy settings may be set for each piece of data of a particular data type.

In various embodiments, the virtual assistant engine 110 assists users to retrieve information from different sources, request services from different service providers, assist users to learn or complete goals and tasks using different sources and/or service providers, and combinations thereof. In some instances, the virtual assistant engine 110 receives input data from the virtual assistant application 130 and determines one or more interactions based on the input data that could be executed to request information, services, and/or complete a goal or task of the user. The interactions are actions that could be presented to a user for execution in an extended reality environment. In some instances, the interactions are influenced by other actions associated with the user. The interactions are aligned with goals or tasks associated with the user. Goals may include things that a user wants to occur or desires (e.g., as a meal, a piece of furniture, a repaired automobile, a house, a garden, a clean apartment, and the like). Tasks may include things that need to be done or activities that should be carried out in order to accomplish a goal or carry out an aim (e.g., cooking a meal using one or more recipes, building a piece of furniture, repairing a vehicle, building a house, planting a garden, cleaning one or more rooms of an apartment, and the like). Each goal and task may be associated with a workflow of actions or sub-tasks for performing the task and achieving the goal. For example, for preparing a salad, a workflow of actions or sub-tasks may include ingredients needed, any equipment needed for the steps (e.g., a knife, a stove top, a pan, a salad spinner), sub-tasks for preparing ingredients (e.g., chopping onions, cleaning lettuce, cooking chicken), and sub-tasks for combining ingredients into subcomponents (e.g., cooking chicken with olive oil and Italian seasonings).

The virtual assistant engine 110 may use AI systems 140 (e.g., rule-based systems or machine-learning based systems, such as natural-language understanding models) to analyze the input based on a user's profile and other relevant information. The result of the analysis may include different interactions associated with a task or goal of the user. The virtual assistant engine 110 may then retrieve information, request services, and/or generate instructions, recommendations, or virtual content associated with one or more of the different interactions for completing tasks or goals. In some instances, the virtual assistant engine 110 interacts with remote systems 115, such as a social-networking system 145 when retrieving information, requesting service, and/or generating instructions or recommendations for the user. The virtual assistant engine 110 may generate virtual content for the user using various techniques, such as natural language generating, virtual object rendering, and the like. The virtual content may include, for example, the retrieved information; the status of the requested services; a virtual object, such as a glimmer overlaid on a physical object such as an appliance, light, or piece of exercise equipment; a demonstration for a task, and the like. In particular embodiments, the virtual assistant engine 110 enables the user to interact with it regarding the information, services, or goals using a graphical or virtual interface, a stateful and multi-turn conversation using dialog-management techniques, and/or a stateful and multi-action interaction using task-management techniques. The functionality of the virtual assistant engine 110 is described in more detail with respect to FIGS. 5-7.

In various embodiments, remote systems 115 may include one or more types of servers, one or more data stores, one or more interfaces, including but not limited to APIs, one or more web services, one or more content sources, one or more networks, or any other suitable components, e.g., that servers may communicate with. A remote system 115 may be operated by a same entity or a different entity from an entity operating the virtual assistant engine 110. In particular embodiments, however, the virtual assistant engine 110 and third-party systems may operate in conjunction with each other to provide virtual content to users of the client system 105. For example, a social-networking system 145 may provide a platform, or backbone, which other systems, such as third-party systems, may use to provide social-networking services and functionality to users across the Internet, and the virtual assistant engine 110 may access these systems to provide virtual content on the client system 105.

In particular embodiments, the social-networking system 145 may be a network-addressable computing system that can host an online social network. The social-networking system 145 may generate, store, receive, and send social-networking data, such as user-profile data, concept-profile data, social-graph information, or other suitable data related to the online social network. The social-networking system 145 may be accessed by the other components of network environment 100 either directly or via a network 120. As an example, and not by way of limitation, the client system 105 may access the social-networking system 145 using a web browser 135, or a native application associated with the social-networking system 145 (e.g., a mobile social-networking application, a messaging application, another suitable application, or any combination thereof) either directly or via a network 120. The social-networking system 145 may provide users with the ability to take actions on various types of items or objects, supported by the social-networking system 145. As an example, and not by way of limitation, the items and objects may include groups or social networks to which users of the social-networking system 145 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 145 or by an external system of the remote systems 115, which is separate from the social-networking system 145 and coupled to the social-networking system via the network 120.

Remote systems 115 may include a content object provider 150. A content object provider 150 includes one or more sources of virtual content objects, which may be communicated to the client system 105. As an example, and not by way of limitation, virtual content objects may include information regarding things or activities of interest to the user, such as movie show times, movie reviews, restaurant reviews, restaurant menus, product information and reviews, instructions on how to perform various tasks, exercise regimens, cooking recipes, or other suitable information. As another example and not by way of limitation, content objects may include incentive content objects, such as coupons, discount tickets, gift certificates, or other suitable incentive objects. As another example and not by way of limitation, content objects may include virtual objects, such as virtual interfaces, two-dimensional (2D) or three-dimensional (3D) graphics, media content, or other suitable virtual objects.

Figure 2A:
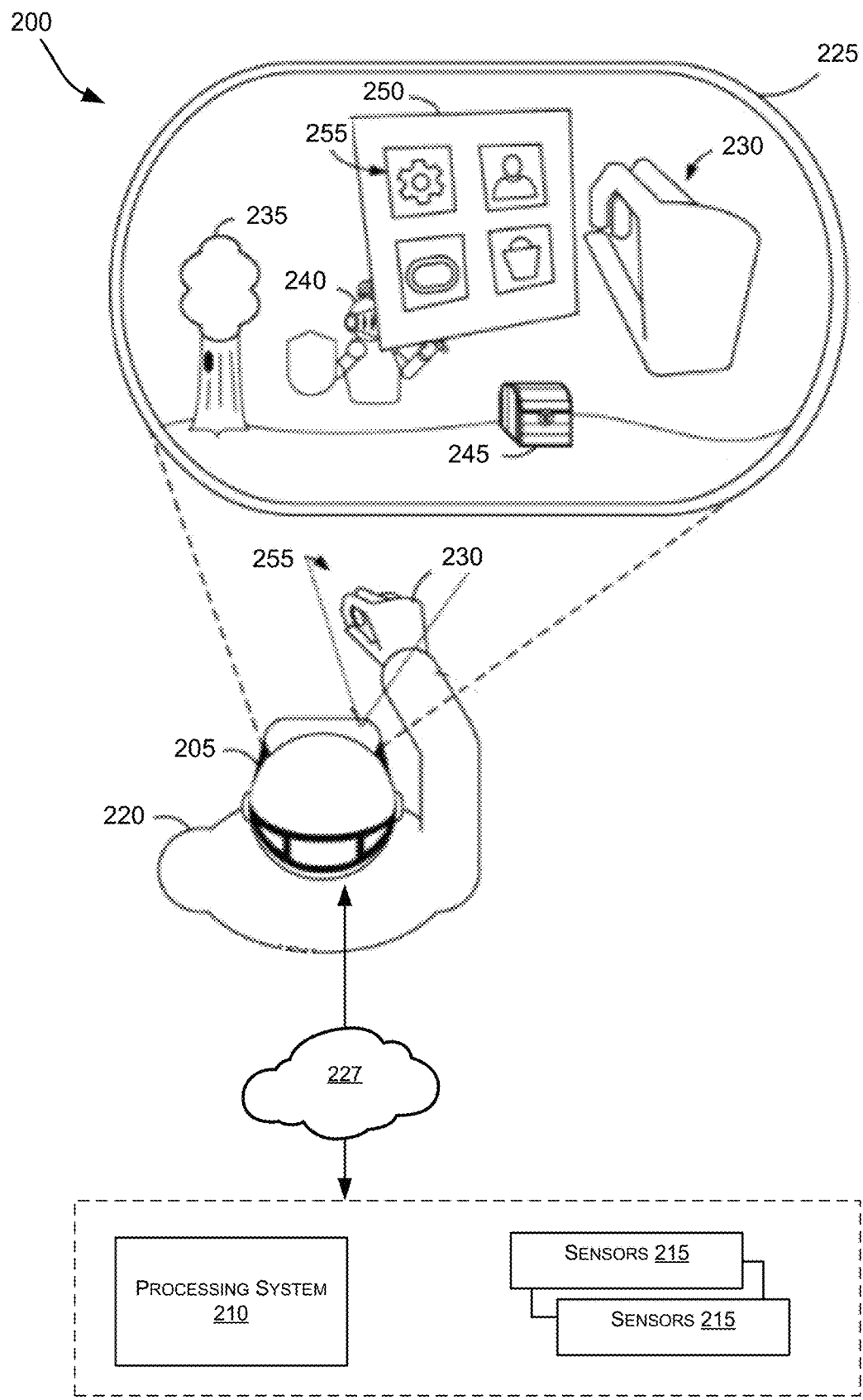
FIG. 2A is an illustration depicting an example extended reality system that presents and controls user interface elements within an extended reality environment in accordance with various embodiments.

FIG. 2A illustrates an example client system 200 (e.g., client system 105 described with respect to FIG. 1) in accordance with aspects of the present disclosure. Client system 200 includes an extended reality system 205 (e.g., an HMD), a processing system 210, and one or more sensors 215. As shown, extended reality system 205 is typically worn by user 220 and includes an electronic display (e.g., a transparent, translucent, or solid display), optional controllers, and optical assembly for presenting extended reality content 225 to the user 220. The one or more sensors 215 may include motion sensors (e.g., accelerometers) for tracking motion of the extended reality system 205 and may include one or more image capturing devices (e.g., cameras, line scanners) for capturing images and other information of the surrounding physical environment. In this example, processing system 210 is shown as a single computing device, such as a gaming console, workstation, a desktop computer, or a laptop. In other examples, processing system 210 may be distributed across a plurality of computing devices, such as a distributed computing network, a data center, or a cloud computing system. In other examples, processing system 210 may be integrated with the HMD. Extended reality system 205, processing system 210, and the one or more sensors 215 are communicatively coupled via a network 227, which may be a wired or wireless network, such as Wi-Fi, a mesh network, or a short-range wireless communication medium, such as Bluetooth wireless technology, or a combination thereof. Although extended reality system 205 is shown in this example as in communication with, e.g., tethered to or in wireless communication with, the processing system 210, in some implementations, extended reality system 205 operates as a stand-alone, mobile extended reality system.

In general, client system 200 uses information captured from a real-world, physical environment to render extended reality content 225 for display to the user 220. In the example of FIG. 2, the user 220 views the extended reality content 225 constructed and rendered by an extended reality application executing on processing system 210 and/or extended reality system 205. In some examples, the extended reality content 225 viewed through the extended reality system 205 includes a mixture of real-world imagery (e.g., the user's hand 230 and physical objects 235) and virtual imagery (e.g., virtual content, such as information or objects 240, 245 and virtual user interface 250) to produce mixed reality and/or augmented reality. In some examples, virtual information or objects 240, 245 may be mapped (e.g., pinned, locked, placed) to a particular position within extended reality content 225. For example, a position for virtual information or objects 240, 245 may be fixed, as relative to one of walls of a residence or surface of the earth, for instance. A position for virtual information or objects 240, 245 may be variable, as relative to a physical object 235 or the user 220, for instance. In some examples, the particular position of virtual information or objects 240, 245 within the extended reality content 225 is associated with a position within the real world, physical environment (e.g., on a surface of a physical object 235).

In the example shown in FIG. 2A, virtual information or objects 240, 245 are mapped at a position relative to a physical object 235. As should be understood, the virtual imagery (e.g., virtual content, such as information or objects 240, 245 and virtual user interface 250) does not exist in the real-world, physical environment. Virtual user interface 250 may be fixed, as relative to the user 220, the user's hand 230, physical objects 235, or other virtual content, such as virtual information or objects 240, 245, for instance. As a result, client system 200 renders, at a user interface position that is locked relative to a position of the user 220, the user's hand 230, physical objects 235, or other virtual content in the extended reality environment, virtual user interface 250 for display at extended reality system 205 as part of extended reality content 225. As used herein, a virtual element 'locked' to a position of virtual content or a physical object is rendered at a position relative to the position of the virtual content or physical object so as to appear to be part of or otherwise tied in the extended reality environment to the virtual content or physical object.

In some implementations, the client system 200 generates and renders virtual content (e.g., GIFs, photos, applications, live-streams, videos, text, a web-browser, drawings, animations, representations of data files, or any other visible media) on a virtual surface. A virtual surface may be associated with a planar or other real-world surface (e.g., the virtual surface corresponds to and is locked to a physical surface, such as a wall, table, or ceiling). In the example shown in FIG. 2A, the virtual surface is associated with the sky and ground of the physical environment. In other examples, a virtual surface can be associated with a portion of a surface (e.g., a portion of the wall). In some examples, only the virtual content items contained within a virtual surface are rendered. In other examples, the virtual surface is generated and rendered (e.g., as a virtual plane or as a border corresponding to the virtual surface). In some examples, a virtual surface can be rendered as floating in a virtual or real-world physical environment (e.g., not associated with a particular real-world surface). The client system 200 may render one or more virtual content items in response to a determination that at least a portion of the location of virtual content items is in a field of view of the user 220. For example, client system 200 may render virtual user interface 250 only if a given physical object (e.g., a lamp) is within the field of view of the user 220.

During operation, the extended reality application constructs extended reality content 225 for display to user 220 by tracking and computing interaction information (e.g., tasks for completion) for a frame of reference, typically a viewing perspective of extended reality system 205. Using extended reality system 205 as a frame of reference and based on a current field of view as determined by a current estimated interaction of extended reality system 205, the extended reality application renders extended reality content 225 which, in some examples, may be overlaid, at least in part, upon the real-world, physical environment of the user 220. During this process, the extended reality application uses sensed data received from extended reality system 205 and sensors 215, such as movement information, contextual awareness, and/or user commands, and, in some examples, data from any external sensors, such as third-party information or device, to capture information within the real world, physical environment, such as motion by user 220 and/or feature tracking information with respect to user 220. Based on the sensed data, the extended reality application determines interaction information to be presented for the frame of reference of extended reality system 205 and, in accordance with the current context of the user 220, renders the extended reality content 225.

Client system 200 may trigger generation and rendering of virtual content based on a current field of view of user 220, as may be determined by real-time gaze 265 tracking of the user, or other conditions. More specifically, image capture devices of the sensors 215 capture image data representative of objects in the real-world, physical environment that are within a field of view of image capture devices. During operation, the client system 200 performs object recognition within images captured by the image capturing devices of extended reality system 205 to identify objects in the physical environment, such as the user 220, the user's hand 230, and/or physical objects 235. Further, the client system 200 tracks the position, orientation, and configuration of the objects in the physical environment over a sliding window of time. Field of view typically corresponds with the viewing perspective of the extended reality system 205. In some examples, the extended reality application presents extended reality content 225 that includes mixed reality and/or augmented reality.

As illustrated in FIG. 2A, the extended reality application may render virtual content, such as virtual information or objects 240, 245 on a transparent display such that the virtual content is overlaid on real-world objects, such as the portions of the user 220, the user's hand 230, or physical objects 235, that are within a field of view of the user 220. In other examples, the extended reality application may render images of real-world objects, such as the portions of the user 220, the user's hand 230, or physical objects 235, that are within a field of view along with virtual objects, such as virtual information or objects 240, 245 within extended reality content 225. In other examples, the extended reality application may render virtual representations of the portions of the user 220, the user's hand 230, and physical objects 235 that are within a field of view (e.g., render real-world objects as virtual objects) within extended reality content 225. In either example, user 220 is able to view the portions of the user 220, the user's hand 230, physical objects 235 and/or any other real-world objects or virtual content that are within a field of view within extended reality content 225. In other examples, the extended reality application may not render representations of the user 220 and the user's hand 230; the extended reality application may instead only render the physical objects 235 and/or virtual information or objects 240, 245.

In various embodiments, the client system 200 renders to extended reality system 205 extended reality content 225 in which virtual user interface 250 is locked relative to a position of the user 220, the user's hand 230, physical objects 235, or other virtual content in the extended reality environment. That is, the client system 205 may render a virtual user interface 250 having one or more virtual user interface elements at a position and orientation that are based on and correspond to the position and orientation of the user 220, the user's hand 230, physical objects 235, or other virtual content in the extended reality environment. For example, if a physical object is positioned in a vertical position on a table, the client system 205 may render the virtual user interface 250 at a location corresponding to the position and orientation of the physical object in the extended reality environment. Alternatively, if the user's hand 230 is within the field of view, the client system 200 may render the virtual user interface at a location corresponding to the position and orientation of the user's hand 230 in the extended reality environment. Alternatively, if other virtual content is within the field of view, the client system 200 may render the virtual user interface at a location corresponding to a general predetermined position of the field of view (e.g., a bottom of the field of view) in the extended reality environment. Alternatively, if other virtual content is within the field of view, the client system 200 may render the virtual user interface at a location corresponding to the position and orientation of the other virtual content in the extended reality environment. In this way, the virtual user interface 250 being rendered in the virtual environment may track the user 220, the user's hand 230, physical objects 235, or other virtual content such that the user interface appears, to the user, to be associated with the user 220, the user's hand 230, physical objects 235, or other virtual content in the extended reality environment.

Figure 2B:
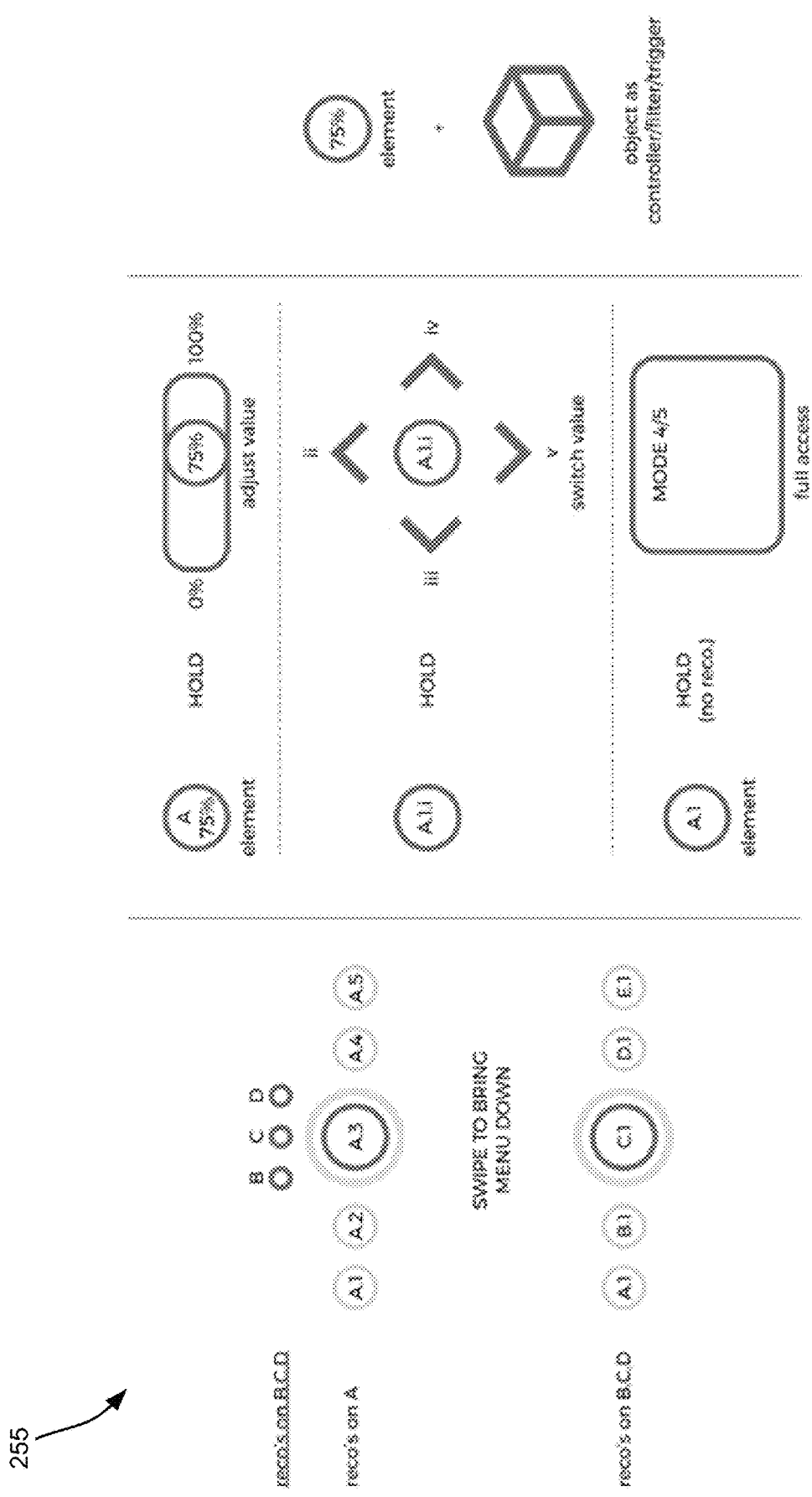
FIG. 2B is an illustration depicting user interface elements in accordance with various embodiments.

As shown in FIGS. 2A and 2B, virtual user interface 250 includes one or more virtual user interface elements. Virtual user interface elements may include, for instance, a virtual drawing interface; a selectable menu (e.g., a drop-down menu); virtual buttons, such as button element 255; a virtual slider or scroll bar; a directional pad; a keyboard; other user-selectable user interface elements including glyphs, display elements, content, user interface controls, and so forth. The particular virtual user interface elements for virtual user interface 250 may be context-driven based on the current extended reality applications engaged by the user 220 or real-world actions/tasks being performed by the user 220. When a user performs a user interface gesture in the extended reality environment at a location that corresponds to one of the virtual user interface elements of virtual user interface 250, the client system 200 detects the gesture relative to the virtual user interface elements and performs an action associated with the gesture and the virtual user interface elements. For example, the user 220 may press their finger at a button element 255 location on the virtual user interface 250. The button element 255 and/or virtual user interface 250 location may or may not be overlaid on the user 220, the user's hand 230, physical objects 235, or other virtual content, e.g., correspond to a position in the physical environment, such as on a light switch or controller at which the client system 200 renders the virtual user interface button. In this example, the client system 200 detects this virtual button press gesture and performs an action corresponding to the detected press of a virtual user interface button (e.g., turns the light on). The client system 205 may also, for instance, animate a press of the virtual user interface button along with the button press gesture.

The client system 200 may detect user interface gestures and other gestures using an inside-out or outside-in tracking system of image capture devices and or external cameras. The client system 200 may alternatively, or in addition, detect user interface gestures and other gestures using a presence-sensitive surface. That is, a presence-sensitive interface of the extended reality system 205 and/or controller may receive user inputs that make up a user interface gesture. The extended reality system 205 and/or controller may provide haptic feedback to touch-based user interaction by having a physical surface with which the user can interact (e.g., touch, drag a finger across, grab, and so forth). In addition, peripheral extended reality system 205 and/or controller may output other indications of user interaction using an output device. For example, in response to a detected press of a virtual user interface button, extended reality system 205 and/or controller may output a vibration or "click" noise, or extended reality system 205 and/or controller may generate and output content to a display. In some examples, the user 220 may press and drag their finger along physical locations on the extended reality system 205 and/or controller corresponding to positions in the virtual environment at which the client system 205 renders virtual user interface elements of virtual user interface 250. In this example, the client system 205 detects this gesture and performs an action according to the detected press and drag of virtual user interface elements, such as by moving a slider bar in the virtual environment. In this way, client system 200 simulates movement of virtual content using virtual user interface elements and gestures.

Various embodiments disclosed herein may include or be implemented in conjunction with various types of extended reality systems. Extended reality content generated by the extended reality systems may include completely computer-generated content or computer-generated content combined with captured (e.g., real-world) content. The extended reality content may include video, audio, haptic feedback, or some combination thereof, any of which may be presented in a single channel or in multiple channels (e.g., stereo video that produces a 3D effect to the viewer). Additionally, in some embodiments, extended reality may also be associated with applications, products, accessories, services, or some combination thereof, that are used to, for example, create content in an extended reality and/or are otherwise used in (e.g., to perform activities in) an extended reality.

The extended reality systems may be implemented in a variety of different form factors and configurations. Some extended reality systems may be designed to work without near-eye displays (NEDs). Other extended reality systems may include an NED that also provides visibility into the real world (e.g., augmented reality system 300 in FIG. 3A) or that visually immerses a user in an extended reality (e.g., virtual reality system 350 in FIG. 3B). While some extended reality devices may be self-contained systems, other extended reality devices may communicate and/or coordinate with external devices to provide an extended reality experience to a user. Examples of such external devices include handheld controllers, mobile devices, desktop computers, devices worn by a user, devices worn by one or more other users, and/or any other suitable external system.

Figure 3A:
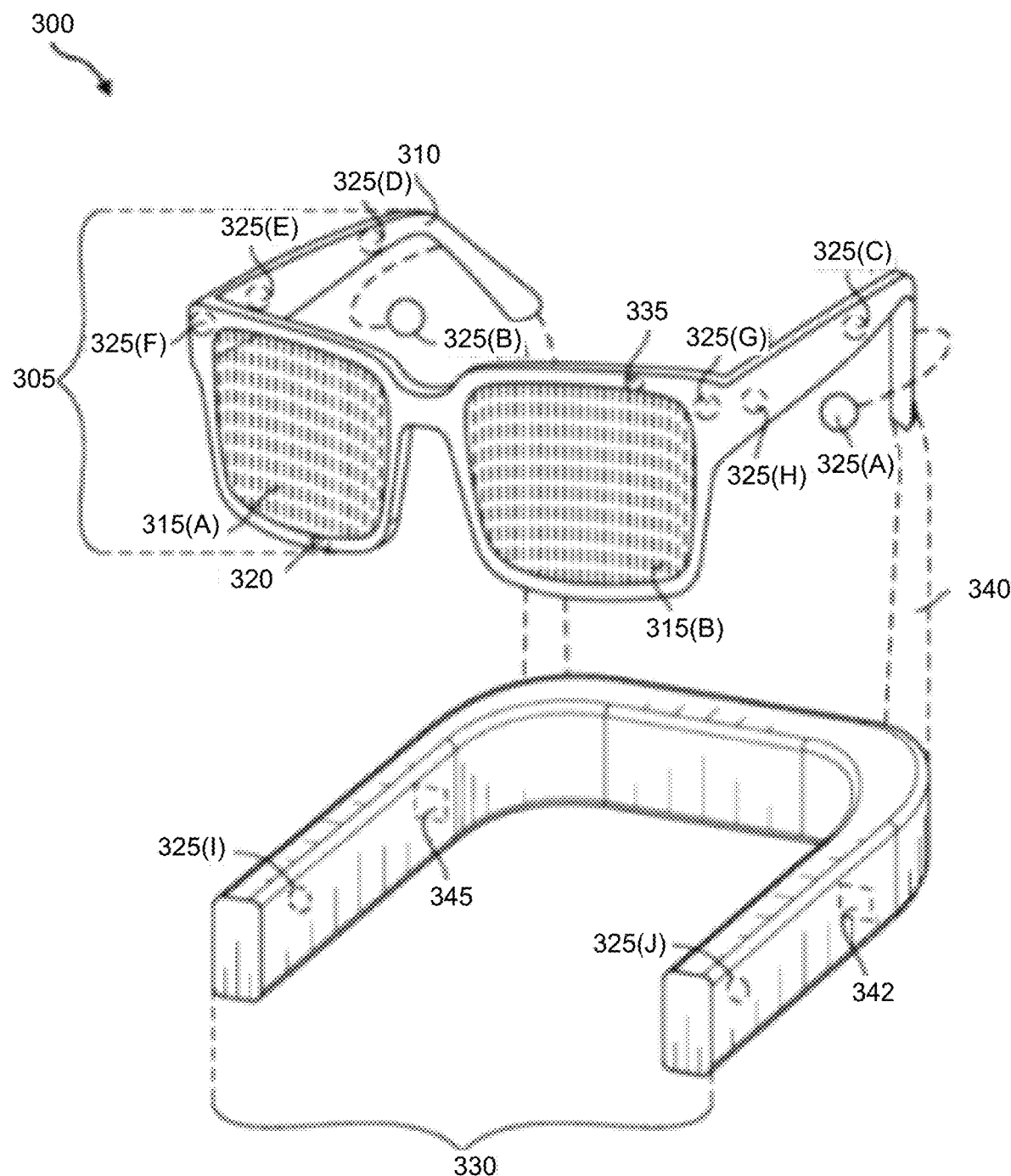
FIG. 3A is an illustration of an augmented reality system in accordance with various embodiments.

As shown in FIG. 3A, augmented reality system 300 may include an eyewear device 305 with a frame 310 configured to hold a left display device 315(A) and a right display device 315(B) in front of a user's eyes. Display devices 315(A) and 315(B) may act together or independently to present an image or series of images to a user. While augmented reality system 300 includes two displays, embodiments of this disclosure may be implemented in augmented reality systems with a single NED or more than two NEDs.

In some embodiments, augmented reality system 300 may include one or more sensors, such as sensor 320. Sensor 320 may generate measurement signals in response to motion of augmented reality system 300 and may be located on substantially any portion of frame 310. Sensor 320 may represent one or more of a variety of different sensing mechanisms, such as a position sensor, an inertial measurement unit (IU), a depth camera assembly, a structured light emitter and/or detector, or any combination thereof. In some embodiments, augmented reality system 300 may or may not include sensor 320 or may include more than one sensor. In embodiments in which sensor 320 includes an IU, the IMU may generate calibration data based on measurement signals from sensor 320. Examples of sensor 320 may include, without limitation, accelerometers, gyroscopes, magnetometers, other suitable types of sensors that detect motion, sensors used for error correction of the IMU, or some combination thereof.

In some examples, augmented reality system 300 may also include a microphone array with a plurality of acoustic transducers 325(A)-325(J), referred to collectively as acoustic transducers 325. Acoustic transducers 325 may represent transducers that detect air pressure variations induced by sound waves. Each acoustic transducer 325 may be configured to detect sound and convert the detected sound into an electronic format (e.g., an analog or digital format). The microphone array in FIG. 3A may include, for example, ten acoustic transducers: 325(A) and 325(B), which may be designed to be placed inside a corresponding ear of the user, acoustic transducers 325(C), 325(D), 325(E), 325(F), 325(G), and 325(H), which may be positioned at various locations on frame 310, and/or acoustic transducers 325(I) and 325(J), which may be positioned on a corresponding neckband 330.

In some embodiments, one or more of acoustic transducers 325(A)-(J) may be used as output transducers (e.g., speakers). For example, acoustic transducers 325(A) and/or 325(B) may be earbuds or any other suitable type of headphone or speaker. The configuration of acoustic transducers 325 of the microphone array may vary. While augmented reality system 300 is shown in FIG. 3A as having ten acoustic transducers, the number of acoustic transducers 325 may be greater or less than ten. In some embodiments, using higher numbers of acoustic transducers 325 may increase the amount of audio information collected and/or the sensitivity and accuracy of the audio information. In contrast, using a lower number of acoustic transducers 325 may decrease the computing power required by an associated controller 335 to process the collected audio information. In addition, the position of each acoustic transducer 325 of the microphone array may vary. For example, the position of an acoustic transducer 325 may include a defined position on the user, a defined coordinate on frame 310, an orientation associated with each acoustic transducer 325, or some combination thereof.

Acoustic transducers 325(A) and 325(B) may be positioned on different parts of the user's ear, such as behind the pinna, behind the tragus, and/or within the auricle or fossa. Alternatively, or additionally, there may be additional acoustic transducers 325 on or surrounding the ear in addition to acoustic transducers 325 inside the ear canal. Having an acoustic transducer 325 positioned next to an ear canal of a user may enable the microphone array to collect information on how sounds arrive at the ear canal. By positioning at least two of acoustic transducers 325 on either side of a user's head (e.g., as binaural microphones), augmented reality system 300 may simulate binaural hearing and capture a 3D stereo sound field around a user's head. In some embodiments, acoustic transducers 325(A) and 325(B) may be connected to augmented reality system 300 via a wired connection 340, and in other embodiments acoustic transducers 325(A) and 325(B) may be connected to augmented reality system 300 via a wireless connection (e.g., a Bluetooth connection). In still other embodiments, acoustic transducers 325(A) and 325(B) may not be used at all in conjunction with augmented reality system 300.

Acoustic transducers 325 on frame 310 may be positioned in a variety of different ways, including along the length of the temples, across the bridge, above or below display devices 315(A) and 315(B), or some combination thereof. Acoustic transducers 325 may also be oriented such that the microphone array is able to detect sounds in a wide range of directions surrounding the user wearing the augmented reality system 300. In some embodiments, an optimization process may be performed during manufacturing of augmented reality system 300 to determine relative positioning of each acoustic transducer 325 in the microphone array.

In some examples, augmented reality system 300 may include or be connected to an external device (e.g., a paired device), such as neckband 330. Neckband 330 generally represents any type or form of paired device. Thus, the following discussion of neckband 330 may also apply to various other paired devices, such as charging cases, smart watches, smart phones, wrist bands, other wearable devices, hand-held controllers, tablet computers, laptop computers, and/or other external computing devices.

As shown, neckband 330 may be coupled to eyewear device 305 via one or more connectors. The connectors may be wired or wireless and may include electrical and/or non-electrical (e.g., structural) components. In some cases, eyewear device 305 and neckband 330 may operate independently without any wired or wireless connection between them. While FIG. 3A illustrates the components of eyewear device 305 and neckband 330 in example locations on eyewear device 305 and neckband 330, the components may be located elsewhere and/or distributed differently on eyewear device 305 and/or neckband 330. In some embodiments, the components of eyewear device 305 and neckband 330 may be located on one or more additional peripheral devices paired with eyewear device 305, neckband 330, or some combination thereof.

Pairing external devices, such as neckband 330, with augmented reality eyewear devices may enable the eyewear devices to achieve the form factor of a pair of glasses while still providing sufficient battery and computation power for expanded capabilities. Some or all of the battery power, computational resources, and/or additional features of augmented reality system 300 may be provided by a paired device or shared between a paired device and an eyewear device, thus reducing the weight, heat profile, and form factor of the eyewear device overall while still retaining desired functionality. For example, neckband 330 may allow components that would otherwise be included on an eyewear device to be included in neckband 330 since users may tolerate a heavier weight load on their shoulders than they would tolerate on their heads. Neckband 330 may also have a larger surface area over which to diffuse and disperse heat to the ambient environment. Thus, neckband 330 may allow for greater battery and computation capacity than might otherwise have been possible on a stand-alone eyewear device. Since weight carried in neckband 330 may be less invasive to a user than weight carried in eyewear device 305, a user may tolerate wearing a lighter eyewear device and carrying or wearing the paired device for greater lengths of time than a user would tolerate wearing a heavy standalone eyewear device, thereby enabling users to incorporate extended reality environments more fully into their day-to-day activities.

Neckband 330 may be communicatively coupled with eyewear device 305 and/or to other devices. These other devices may provide certain functions (e.g., tracking, localizing, depth mapping, processing, storage) to augmented reality system 300. In the embodiment of FIG. 3A, neckband 330 may include two acoustic transducers (e.g., 325(I) and 325(J)) that are part of the microphone array (or potentially form their own microphone subarray). Neckband 330 may also include a controller 342 and a power source 345.

Acoustic transducers 325(I) and 325(J) of neckband 330 may be configured to detect sound and convert the detected sound into an electronic format (analog or digital). In the embodiment of FIG. 3A, acoustic transducers 325(I) and 325(J) may be positioned on neckband 330, thereby increasing the distance between the neckband acoustic transducers 325(I) and 325(J) and other acoustic transducers 325 positioned on eyewear device 305. In some cases, increasing the distance between acoustic transducers 325 of the microphone array may improve the accuracy of beamforming performed via the microphone array. For example, if a sound is detected by acoustic transducers 325(C) and 325(D) and the distance between acoustic transducers 325(C) and 325 (D) is greater than, e.g., the distance between acoustic transducers 325(D) and 325(E), the determined source location of the detected sound may be more accurate than if the sound had been detected by acoustic transducers 325(D) and 325(E).

Controller 342 of neckband 330 may process information generated by the sensors on neckband 330 and/or augmented reality system 300. For example, controller 342 may process information from the microphone array that describes sounds detected by the microphone array. For each detected sound, controller 342 may perform a direction-of-arrival (DOA) estimation to estimate a direction from which the detected sound arrived at the microphone array. As the microphone array detects sounds, controller 342 may populate an audio data set with the information. In embodiments in which augmented reality system 300 includes an inertial measurement unit, controller 342 may compute all inertial and spatial calculations from the IMU located on eyewear device 305. A connector may convey information between augmented reality system 300 and neckband 330 and between augmented reality system 300 and controller 342. The information may be in the form of optical data, electrical data, wireless data, or any other transmittable data form. Moving the processing of information generated by augmented reality system 300 to neckband 330 may reduce weight and heat in eyewear device 305, making it more comfortable to the user.

Power source 345 in neckband 330 may provide power to eyewear device 305 and/or to neckband 330. Power source 345 may include, without limitation, lithium-ion batteries, lithium-polymer batteries, primary lithium batteries, alkaline batteries, or any other form of power storage. In some cases, power source 345 may be a wired power source. Including power source 345 on neckband 330 instead of on eyewear device 305 may help better distribute the weight and heat generated by power source 345.

As noted, some extended reality systems may, instead of blending an extended reality with actual reality, substantially replace one or more of a user's sensory perceptions of the real world with a virtual experience. One example of this type of system is a head-worn display system, such as virtual reality system 350 in FIG. 3B, that mostly or completely covers a user's field of view. Virtual reality system 350 may include a front rigid body 355 and a band 360 shaped to fit around a user's head. Virtual reality system 350 may also include output audio transducers 365(A) and 365(B). Furthermore, while not shown in FIG. 3B, front rigid body 355 may include one or more electronic elements, including one or more electronic displays, one or more inertial measurement units (IMUs), one or more tracking emitters or detectors, and/or any other suitable device or system for creating an extended reality experience.

Extended reality systems may include a variety of types of visual feedback mechanisms. For example, display devices in augmented reality system 300 and/or virtual reality system 350 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These extended reality systems may include a single display screen for both eyes or may provide a display screen for each eye, which may allow for additional flexibility for varifocal adjustments or for correcting a user's refractive error. Some of these extended reality systems may also include optical subsystems having one or more lenses (e.g., conventional concave or convex lenses, Fresnel lenses, adjustable liquid lenses) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (e.g., a single lens configuration that directly collimates light but results in so-called pincushion distortion) and/or a pupil-forming architecture (e.g., a multi-lens configuration that produces so-called barrel distortion to nullify pincushion distortion).

In addition to or instead of using display screens, some of the extended reality systems described herein may include one or more projection systems. For example, display devices in augmented reality system 300 and/or virtual reality system 350 may include micro-LED projectors that project light (using, e.g., a waveguide) into display devices, such as clear combiner lenses that allow ambient light to pass through. The display devices may refract the projected light toward a user's pupil and may enable a user to simultaneously view both extended reality content and the real world. The display devices may accomplish this using any of a variety of different optical components, including waveguide components (e.g., holographic, planar, diffractive, polarized, and/or reflective waveguide elements), light-manipulation surfaces and elements (e.g., diffractive, reflective, and refractive elements and gratings), and/or coupling elements. Extended reality systems may also be configured with any other suitable type or form of image projection system, such as retinal projectors used in virtual retina displays.

The extended reality systems described herein may also include various types of computer vision components and subsystems. For example, augmented reality system 300 and/or virtual reality system 350 may include one or more optical sensors, such as 2D or 3D cameras, structured light transmitters and detectors, time-of-flight depth sensors, single-beam or sweeping laser rangefinders, 3D LiDAR sensors, and/or any other suitable type or form of optical sensor. An extended reality system may process data from one or more of these sensors to identify a location of a user, to map the real world, to provide a user with context about real-world surroundings, and/or to perform a variety of other functions.

The extended reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the extended reality systems described herein may also include tactile (e.g., haptic) feedback systems, which may be incorporated into headwear, gloves, body suits, handheld controllers, environmental devices (e.g., chairs, floormats), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other extended reality devices, within other extended reality devices, and/or in conjunction with other extended reality devices.

By providing haptic sensations, audible content, and/or visual content, extended reality systems may create an entire virtual experience or enhance a user's real-world experience in a variety of contexts and environments. For instance, extended reality systems may assist or extend a user's perception, memory, or cognition within a particular environment. Some systems may enhance a user's interactions with other people in the real world or may enable more immersive interactions with other people in a virtual world. Extended reality systems may also be used for educational purposes (e.g., for teaching or training in schools, hospitals, government organizations, military organizations, business enterprises), entertainment purposes (e.g., for playing video games, listening to music, watching video content), and/or for accessibility purposes (e.g., as hearing aids, visual aids). The embodiments disclosed herein may enable or enhance a user's extended reality experience in one or more of these contexts and environments and/or in other contexts and environments.

As noted, extended reality systems 300 and 350 may be used with a variety of other types of devices to provide a more compelling extended reality experience. These devices may be haptic interfaces with transducers that provide haptic feedback and/or that collect haptic information about a user's interaction with an environment. The extended reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 4A:
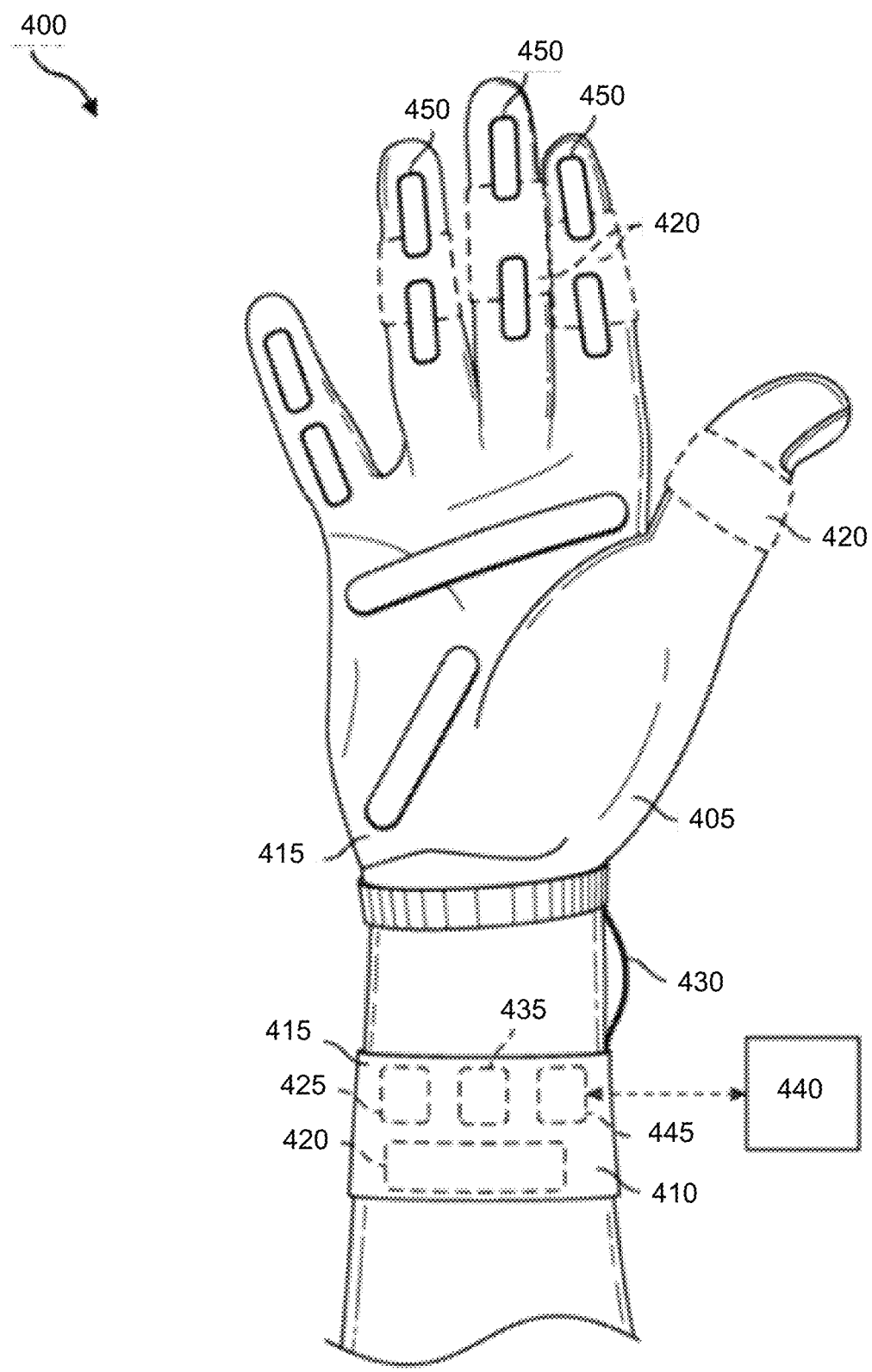
FIG. 4A is an illustration of haptic devices in accordance with various embodiments.

Haptic feedback may be provided by interfaces positioned within a user's environment (e.g., chairs, tables, floors) and/or interfaces on articles that may be worn or carried by a user (e.g., gloves, wristbands). As an example, FIG. 4A illustrates a vibrotactile system 400 in the form of a wearable glove (haptic device 405) and wristband (haptic device 410). Haptic device 405 and haptic device 410 are shown as examples of wearable devices that include a flexible, wearable textile material 415 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 420 may be positioned at least partially within one or more corresponding pockets formed in textile material 415 of vibrotactile system 400. Vibrotactile devices 420 may be positioned in locations to provide a vibrating sensation (e.g., haptic feedback) to a user of vibrotactile system 400. For example, vibrotactile devices 420 may be positioned against the user's finger(s), thumb, or wrist, as shown in FIG. 4A. Vibrotactile devices 420 may, in some examples, be sufficiently flexible to conform to or bend with the user's corresponding body part(s).

A power source 425 (e.g., a battery) for applying a voltage to the vibrotactile devices 420 for activation thereof may be electrically coupled to vibrotactile devices 420, such as via conductive wiring 430. In some examples, each of vibrotactile devices 420 may be independently electrically coupled to power source 425 for individual activation. In some embodiments, a processor 435 may be operatively coupled to power source 425 and configured (e.g., programmed) to control activation of vibrotactile devices 420.

Vibrotactile system 400 may be implemented in a variety of ways. In some examples, vibrotactile system 400 may be a standalone system with integral subsystems and components for operation independent of other devices and systems. As another example, vibrotactile system 400 may be configured for interaction with another device or system 440. For example, vibrotactile system 400 may, in some examples, include a communications interface 445 for receiving and/or sending signals to the other device or system 440. The other device or system 440 may be a mobile device, a gaming console, an extended reality (e.g., virtual reality, augmented reality, mixed reality) device, a personal computer, a tablet computer, a network device (e.g., a modem, a router), and a handheld controller. Communications interface 445 may enable communications between vibrotactile system 400 and the other device or system 440 via a wireless (e.g., Wi-Fi, Bluetooth, cellular, radio) link or a wired link. If present, communications interface 445 may be in communication with processor 435, such as to provide a signal to processor 435 to activate or deactivate one or more of the vibrotactile devices 420.

Vibrotactile system 400 may optionally include other subsystems and components, such as touch-sensitive pads 450, pressure sensors, motion sensors, position sensors, lighting elements, and/or user interface elements (e.g., an on/off button, a vibration control element). During use, vibrotactile devices 420 may be configured to be activated for a variety of different reasons, such as in response to the user's interaction with user interface elements, a signal from the motion or position sensors, a signal from the touch-sensitive pads 450, a signal from the pressure sensors, and a signal from the other device or system 440

Although power source 425, processor 435, and communications interface 445 are illustrated in FIG. 4A as being positioned in haptic device 410, the present disclosure is not so limited. For example, one or more of power source 425, processor 435, or communications interface 445 may be positioned within haptic device 405 or within another wearable textile.

Figure 4B:
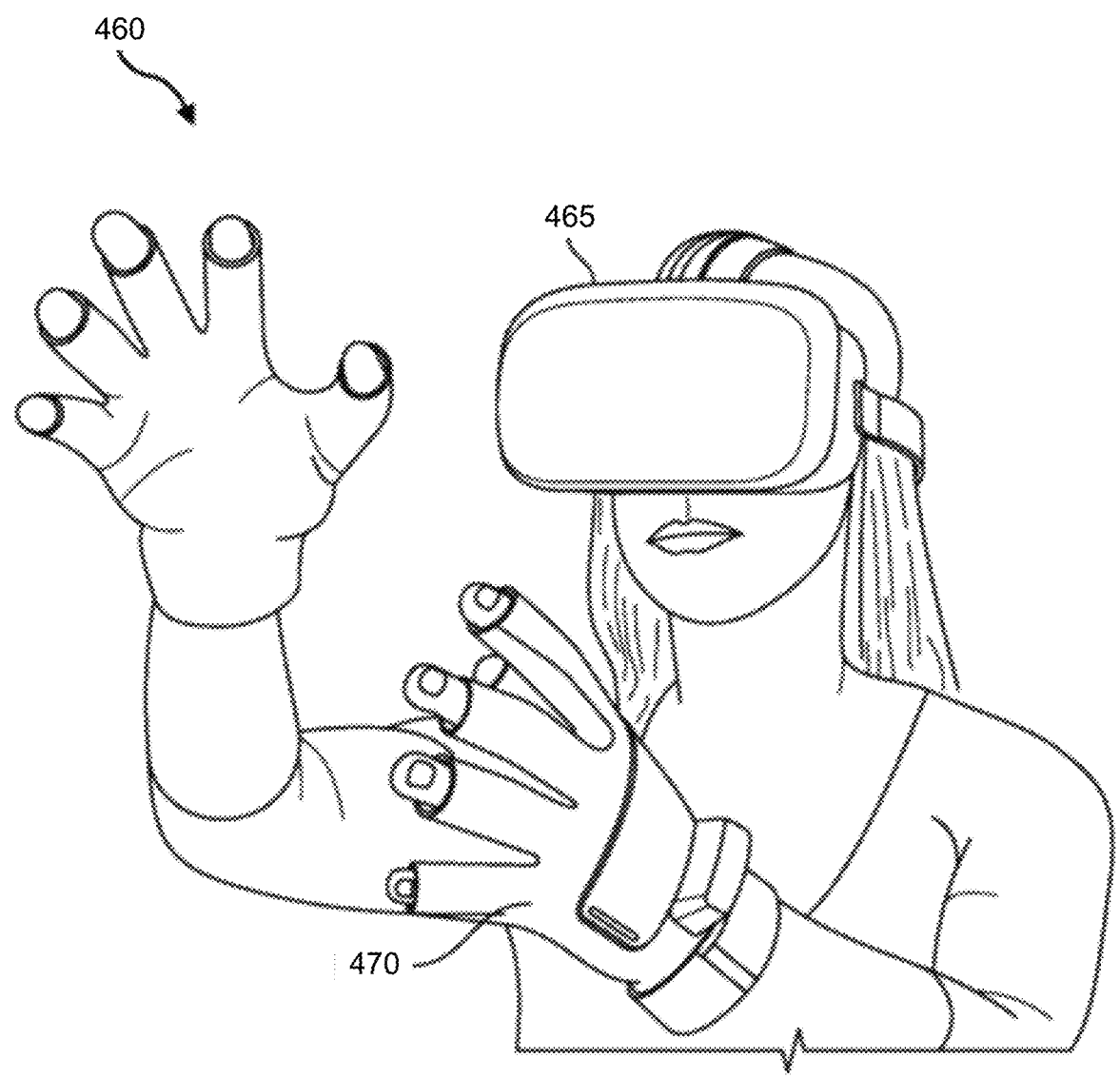
FIG. 4B is an illustration of an exemplary virtual reality environment in accordance with various embodiments.

Haptic wearables, such as those shown in and described in connection with FIG. 4A, may be implemented in a variety of types of extended reality systems and environments. FIG. 4B shows an example extended reality environment 460 including one head-mounted virtual reality display and two haptic devices (e.g., gloves), and in other embodiments any number and/or combination of these components and other components may be included in an extended reality system. For example, in some embodiments, there may be multiple head-mounted displays each having an associated haptic device, with each head-mounted display, and each haptic device communicating with the same console, portable computing device, or other computing system—

Figure 3B:
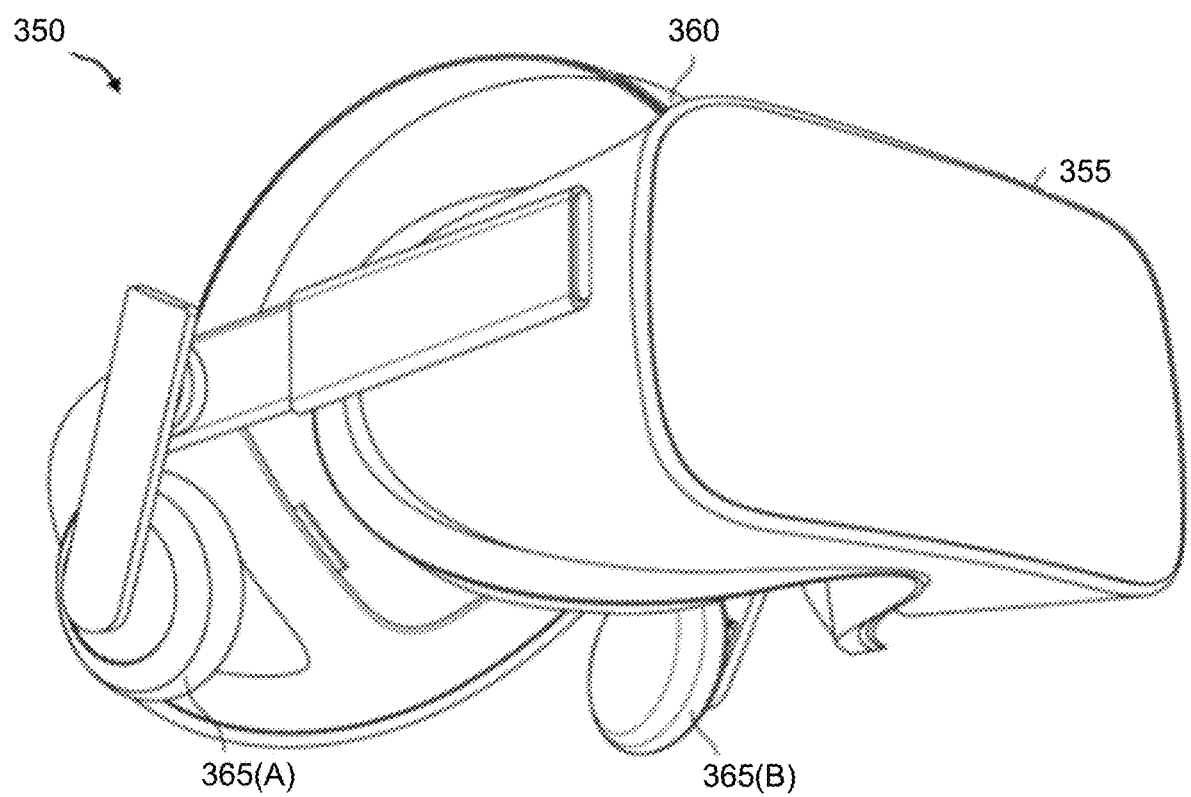
FIG. 3B is an illustration of a virtual reality system in accordance with various embodiments.

HMD 465 generally represents any type or form of virtual reality system, such as virtual reality system 350 in FIG. 3B. Haptic device 470 generally represents any type or form of wearable device, worn by a user of an extended reality system, that provides haptic feedback to the user to give the user the perception that he or she is physically engaging with a virtual object. In some embodiments, haptic device 470 may provide haptic feedback by applying vibration, motion, and/or force to the user. For example, haptic device 470 may limit or augment a user's movement. To give a specific example, haptic device 470 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 470 to send action requests to a console. Examples of action requests include, without limitation, requests to start an application and/or end the application and/or requests to perform a particular action within the application.

Figure 4C:
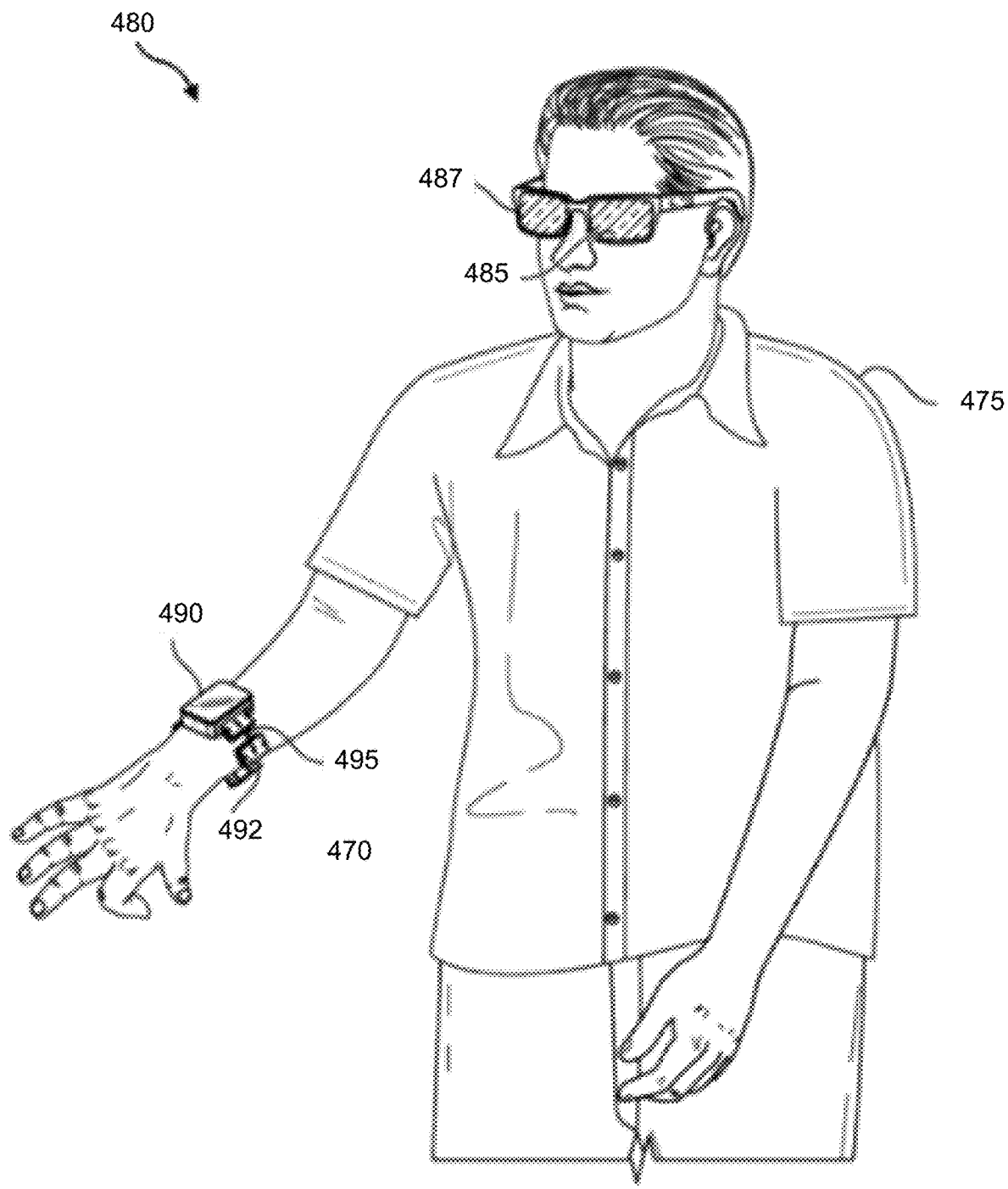
FIG. 4C is an illustration of an exemplary augmented reality environment in accordance with various embodiments.

While haptic interfaces may be used with virtual reality systems, as shown in FIG. 4B, haptic interfaces may also be used with augmented reality systems, as shown in FIG. 4C. FIG. 4C is a perspective view of a user 475 interacting with an augmented reality system 480. In this example, user 475 may wear a pair of augmented reality glasses 485 that may have one or more displays 487 and that are paired with a haptic device 490. In this example, haptic device 490 may be a wristband that includes a plurality of band elements 492 and a tensioning mechanism 495 that connects band elements 492 to one another.

One or more of band elements 492 may include any type or form of actuator suitable for providing haptic feedback. For example, one or more of band elements 492 may be configured to provide one or more of various types of cutaneous feedback, including vibration, force, traction, texture, and/or temperature. To provide such feedback, band elements 492 may include one or more of various types of actuators. In one example, each of band elements 492 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 405, 410, 470, and 490 may include any suitable number and/or type of haptic transducer, sensor, and/or feedback mechanism. For example, haptic devices 405, 410, 470, and 490 may include one or more mechanical transducers, piezoelectric transducers, and/or fluidic transducers. Haptic devices 405, 410, 470, and 490 may also include various combinations of different types and forms of transducers that work together or independently to enhance a user's extended reality experience. In one example, each of band elements 492 of haptic device 490 may include a vibrotactor (e.g., a vibrotactile actuator) configured to vibrate in unison or independently to provide one or more various types of haptic sensations to a user.

Providing Spatiotemporal Visual Guidance within 360-Degree Video

Figure 5:
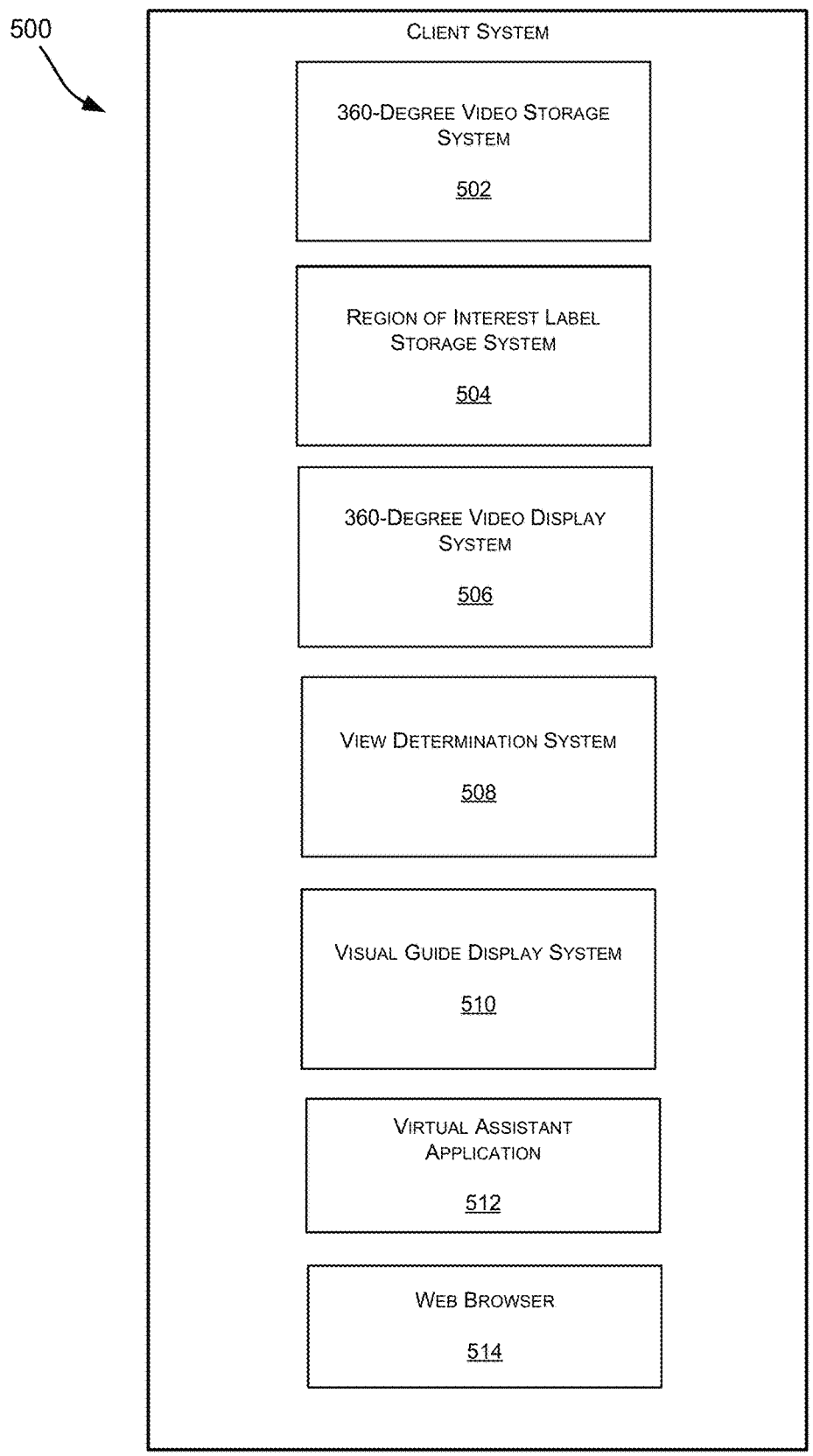
FIG. 5 is an illustration of an embodiment of a client system for providing spatiotemporal visual guidance within 360-degree video in accordance with various embodiments.

FIG. 5 illustrates an embodiment of a client system 500. In one embodiment, the client system 500 may represent the client system 105 of FIG. 1. As shown in FIG. 5, a 360-degree video storage system 502 may receive and store a 360-degree video to be displayed. For example, the 360-degree video storage system 502 may store the entirety of a 360-degree video, one or more portions of a streaming 360-degree video, etc.

Additionally, a region of interest (ROI) label storage system 504 may receive and store one or more labels indicating regions of interest within the received 360-degree video. For example, labels indicating the ROIs can be created by a creator of the 360-degree video, a third-party associated with the 360-degree video, etc. These labels may each include a bounding box indicating a location of the ROIs within the 360-degree video as well as a time during which the ROIs are active within the 360-degree video (e.g., start and end times, etc.). For instance, an ROI may be active when the ROI is currently determined to be a primary subject of the 360-degree video (but is not necessarily the current focus of the user's gaze). An ROI may also be active when the ROI includes one or more visible occurrences (e.g., one or more actions, objects, etc.) that are determined to be of interest to the user. The labels for each ROI may also include a name assigned to that ROI.

Further, a 360-degree video display system 506 may retrieve and display one or more portions of the 360-degree video. For example, the 360-degree video display system 506 may render and display to a user/viewer one or more portions of the 360-degree video. In another example, the 360-degree video display system 506 may include a visual display (such as one or more screens) that are used to present the one or more portions of the 360-degree video.

Further still, a view determination system 508 determines a location of a user's current view within the 360-degree video. For example, while the 360-degree video is being presented to the user by the 360-degree video display system 506, the view determination system 508 may determine a position/location within the 360-degree video that is currently being viewed by the user. The view determination system 508 may utilize a position (such as a yaw orientation) of the HMD, a position of the user's head, eye tracking, or a combination thereof to determine a location of the user's current view within the 360-degree video.

Also, a visual guide display system 510 may generate and present a visual guide to the user. For example, the visual guide display system 510 may retrieve the location of the user's current view within the 360-degree video from the view determination system 508, and may also retrieve ROI labels from the ROI label storage system 504, where such labels include a location of the ROIs within the 360-degree video as well as a time during which the ROIs are active within the 360-degree video.

Based on this retrieved information, the visual guide display system 510 may generate a visual guide, where the visual guide indicates a location of each ROI within the 360-degree video with respect to the current location of the view of the user, as well as the time during which the region of interest is active within the 360-degree video. For example, the visual guide may include a visualization of a radar (e.g., a circular shaped radar) including a central object that aligns with the current location of the view of the user. The visual guide may also include geometric wedges each representing a location of one of the ROIs within the 360-degree video and a time when each ROI is active.

For instance, a distance of the geometric wedge from a center of the central object (or a predetermined location within the central object indicative of a current time in the 360-degree video, such as a perimeter/circumference of the central object) may correspond to a difference between a current time in the 360-degree video and a time in which an ROI represented by the geometric wedge is active. Also, an angular location of the geometric wedge with respect to the central object may indicate a spatial direction of the region of interest (e.g., in the yaw dimension) with respect to a current location of the view of the user.

In addition, the virtual assistant application 512 may correspond to the virtual assistant application 130 of FIG. 1, and the web browser 514 may correspond to the web browser 135 of FIG. 1.

In this way, the client system 500 may provide spatiotemporal guidance to a user viewing a 360-degree video, where this guidance allows the viewer to anticipate regions of interest and adjust a location of their gaze so that they may view such regions of interest when the regions of interest are active within the 360-degree video.

Illustrative Methods

Figure 6:
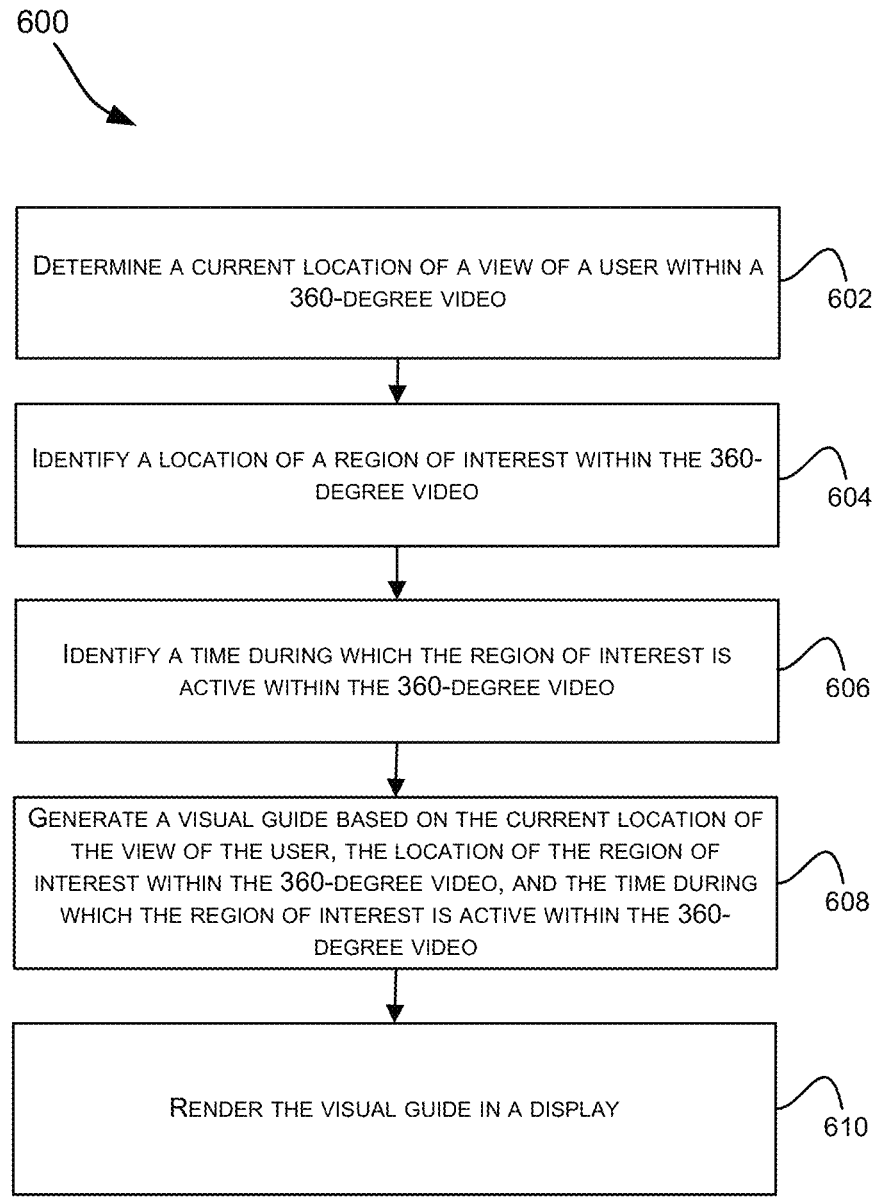
FIG. 6 is an illustration of a flowchart of an example process for providing spatiotemporal visual guidance within 360-degree video accordance with various embodiments.
Figure 12:
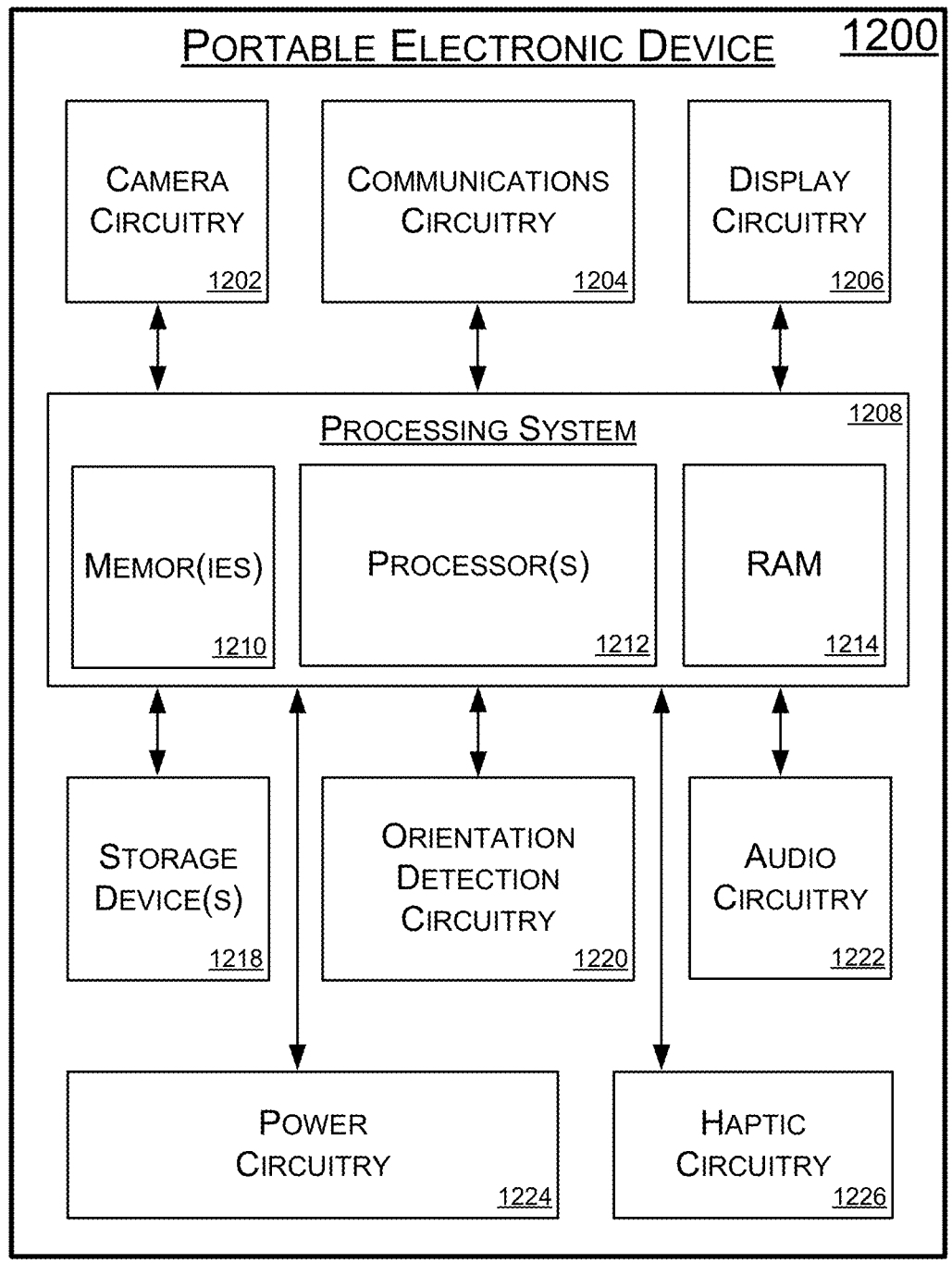
FIG. 12 is an illustration of a portable electronic device in accordance with various embodiments.

FIG. 6 is an illustration of a flowchart of an example process 600 for providing spatiotemporal visual guidance within 360-degree video in accordance with various embodiments. In some examples, the process is implemented by client system 105 described above, extended reality system 500 described above, or a portable electronic device, such as portable electronic device 1200 as shown in FIG. 12. The process 600 can be implemented in software or hardware or any combination thereof.

At block 602, a current location of a view of a user within a 360-degree video is determined. In one embodiment, the current location of the view of the user may include a portion of the 360-degree video being currently viewed by the user. In another embodiment, the current location of the view of the user may include a physical location within the 360-degree video. In yet another embodiment, the current location of the view of the user may include a current viewing angle of a user viewing the 360-degree video.

Additionally, in one embodiment, the current location of the view of the user may be determined utilizing one or more sensors included within a device being viewed by the user. For example, the device may include a head-mounted display, a mobile device, etc. In another example, the device may include the client system 105 of FIG. 1.

Further, in one embodiment, the current location of the view of the user may be determined by tracking a location of the user's eyes and/or head, utilizing one or more sensors included within the device being viewed by the user. In another embodiment, the 360-degree video may include a video recording where a view in every direction is recorded at the same time. For example, the 360-degree video may be created using an omnidirectional camera or a collection of cameras.

At block 604, a location of a region of interest (ROI) within the 360-degree video is identified. In one embodiment, a label indicating the ROI can be created by a creator of the 360-degree video, a third-party associated with the 360-degree video, etc. In another embodiment, the label for the ROI can be by a client system that received the 360-degree video. For example, the label for the ROI may be generated utilizing one or more algorithms run by the client system, etc.

Also, in one embodiment, the label for the ROI may include a bounding box indicating a location of the ROI within the 360-degree video, a starting time for the ROI within the 360-degree video, etc. For example, the label may include a bounding box indicating a region of the ROI within the 360-degree video as well as a time in which the ROI becomes active within the 360-degree video. In another example, the bounding box may be defined utilizing a geometric shape (such as a rectangle, a polygon, etc.), a polyline, one or more pixels, etc.

In addition, in one embodiment, the label may be stored in a predetermined format (such as an extensible markup language (XML) format, etc.). In another embodiment, the label for the ROI may include a label name. In yet another embodiment, the label for the ROI may be created and/or read before playing or rendering the 360-degree video. For example, the label for the ROI may be included within the 360-degree video. In another embodiment, the label for the ROI may be created and/or read during playing or rendering the 360-degree video. In still another embodiment, a plurality of different regions of interest may be labeled within the 360-degree video.

Further, in one embodiment, the ROI may be identified by searching for the label for the ROI (e.g., where such search is performed either within the 360-degree video or within one or more files that supplement the 360-degree video). For example, while the 360-degree video is being played, a search may be performed over a future window of time within the 360-degree video (e.g., a window covering a predetermined number of seconds ahead of a current time within the 360-degree video) for labels for ROIs associated with the 360-degree video. In response to identifying a label for the ROI during that future window of time, the label may be parsed/analyzed to identify one or more of a location of the ROI within the 360-degree video, a time in which the ROI becomes active within the 360-degree video, a duration of the ROI within the 360-degree video, etc.

At block 606, a time during which the region of interest is active within the 360-degree video is identified. In one embodiment, the time during which the region of interest is active within the 360-degree video may include a time in which one or more entities within the region of interest are viewable within the 360-degree video, one or more actions occur within the region of interest, etc. In another embodiment, the label for the ROI may include start and end times for the ROI within the 360-degree video. In yet another embodiment, the start and end time for the ROI may be indicated as a subset of a total running time of the 360-degree video.

In one embodiment, while the 360-degree video is being played, a search may be performed over a future window of time within the 360-degree video (e.g., a window covering a predetermined number of seconds ahead of a current time within the 360-degree video) for labels for ROIs associated with the 360-degree video. In response to identifying a label for the ROI during that future window of time, the label may be analyzed to identify a duration of the ROI within the 360-degree video, which may be identified as the time during which the region of interest is active within the 360-degree video.

At block 608, a visual guide is generated based on the current location of the view of the user, the location of the region of interest within the 360-degree video, and the time during which the region of interest is active within the 360-degree video. The visual guide indicates a location of the region of interest within the 360-degree video with respect to the current location of the view of the user, and the time during which the region of interest is active within the 360-degree video. In one embodiment, the visual guide may include a visual widget presented to the user that represents a top-down overview of the 360-degree scene.

Also, in one embodiment, the visual guide may be overlaid on top of the 360-degree video. In another embodiment, the visual guide may be positioned at a predetermined location within a display that is presenting the 360-degree video. In yet another embodiment, a first shape may be rendered within the visual guide, where the first shape includes a top-down view of the VR environment within the 360-degree video with the user at the center. In one example, the first shape (such as a geometric shape, an icon/avatar, etc.) represents the user themselves. The first shape may be rendered within the visual guide such that it aligns with the current location of the view of the user within the 360-degree video. For example, the first shape may be rendered in the center of the visual guide, where a top center location (e.g., a true north location, a 12:00 clock location, etc.) within the visual guide represents the user's current view.

Additionally, in one embodiment, the region of interest may be rendered as a second shape within the visual guide, where the second shape is rendered within the visual guide in relation to the first shape (corresponding to the current location of the view of the user). For example, the first shape may include a central object that aligns with the current location of the view of the user. A top of the central object may always point toward a front-facing direction of the user, and a bottom of the central object may always point to the direction immediately behind the user (in a manner similar to a compass). The location of a view of the user may be determined as a point on a circumference or perimeter of a circle or sphere associated with the 360-degree video, and this point may be used to align the first shape within the visual guide.

Further, in one embodiment, the location of the ROI may be determined as a region on the circumference or perimeter of a circle or sphere associated with the 360-degree video, and the location of the region with respect to the point representing the location of a view of the user may be used to determine the angular location of the second shape with respect to the first shape within the visual guide. The region of interest may be rendered as an icon and/or image within the visual guide. For example, the icon and/or image may represent an entity shown within the ROI. In another embodiment, the ROI may be rendered within the visual guide in response to determining that a difference between a current time and a time during which the ROI becomes active is less than a predetermined threshold time (such as ten seconds, etc.). In yet another embodiment, the region of interest may be rendered as a geometric wedge within the visual guide.

Further still, in one embodiment, the geometric wedge (representing the ROI) may be rendered within the visual guide at an angular location with respect to the central object (representing the current location of the view of the user) that represents a spatial direction of the region of interest (e.g., in the yaw dimension) with respect to a current location of the view of the user. For example, as a current location of the view of the user changes, the angular location of the geometric wedge (representing the ROI) may change to account for the adjusted location of the ROI with respect to the current location of the view of the user.

Also, in one embodiment, the second shape (representing the region of interest) may be rendered at a predetermined distance from the first shape (representing the current location of the view of the user) within the visual guide that corresponds to a difference between a current time in the 360-degree video and a time in which the ROI is active. For example, a predetermined unit of distance (such as one or more pixels) between the geometric wedge and the first shape (or a center or predetermined portion of the central object) may correspond to a predetermined unit of time. A difference between a current time in the 360-degree video and a time in which the ROI is active may be determined, and a predetermined distance (e.g., in pixels) may be determined based on this difference. The second shape may then be rendered within the visual guide at the predetermined distance from a predetermined location within the first shape, where the location is indicative of a current time in the 360-degree video. For example, the predetermined location within the first shape may be a center of the first shape, a circumference/perimeter/border of the first shape, etc. As the time progresses within the 360-degree video, and the difference between a current time in the 360-degree video and a time in which the ROI is active also decreases, the rendering of the geometric wedge may be updated such that the distance between the geometric wedge and the predetermined location within the first shape may decrease as well to account for the decrease in a time until the ROI is active within the 360-degree video.

In another embodiment, before playing (or at the beginning of playing) the 360-degree video, labels for all ROIs associated with the 360-degree video may be determined. A group of second shapes (such as geometric wedges), each representing one of these ROIs, may then be generated and placed within the visual guide, where each of the second shapes is placed at a distance from the first shape (representing the current location of the view of the user) that corresponds to a time in which the corresponding ROI is active. Each of these second shapes may initially be set as transparent (invisible) within the visual guide. As the 360-degree video plays, each second shape may be updated such that the distance between the second shape and the center of the first shape decreases to account for the decrease in a time until the corresponding ROI is active within the 360-degree video. When the time until an ROI is active within the 360-degree video decreases past a threshold time amount (e.g., ten seconds), the corresponding second shape for that ROI may be changed from transparent to translucent/opaque (visible) within the visual guide.

In addition, in one embodiment, a radial thickness of the geometric wedge represents a duration of the ROI within the 360-degree video. In another embodiment, in response to determining that the ROI is present within the entirety of the 360-degree video during a predetermined time, the ROI may be presented as a concentric circle (such as a donut) that surrounds the central object. In yet another embodiment, as the 360-degree video plays, the geometric wedge (representing the ROI) may move toward the central object (representing the current location of the view of the user).

For example, the geometric wedge may move toward the central object at a constant speed, where the constant speed may correspond to a framerate of the device presenting the 360-degree video. The device may update frames of the 360-degree video at a predetermined framerate, and the position of the geometric wedge may be updated as each frame is presented. Furthermore, in one embodiment, a color and/or transparency of the geometric wedge (representing the ROI) may change as the geometric wedge approaches the central object. For example, the geometric wedge may become lighter or darker in color as it approaches the central object. In another example, the geometric wedge may become less or more transparent as it approaches the central object.

Further still, in one embodiment, the ROI may be active when the geometric wedge (representing the ROI) intersects/overlaps with the central object (representing the current location of the view of the user). In another embodiment, if the current location of the view of the user allows for the ROI to be viewed when the ROI is active, the geometric wedge (representing the ROI) may change color, transparency, etc. For example, the geometric wedge may change from a first color to a second color if the ROI is within a predetermined percentage of a visible vector of a user while the ROI is active. In another example, the geometric wedge may change color in response to determining that the ROI is currently active and has been viewed for an amount of time greater than a predetermined threshold. The geometric wedge may then be removed from the visual guide when the ROI is no longer active (e.g., no longer visible within the 360-degree video, etc.).

Also, in one embodiment, if the current location of the view of the user does not allow for the ROI to be viewed when the ROI is active, one or more characteristics of the central object (representing the current location of the view of the user) may be altered. For example, an outer perimeter of the central object may change color/transparency if the ROI is not within a predetermined percentage of a visible vector of a user while the ROI is active.

Additionally, in one embodiment, if the current location of the view of the user does not enable the ROI to be viewed when the ROI is active, one or more additional visual indicators may be provided to the user within the visual guide. For example, one or more arrows may be presented to the user that indicate vertical and/or horizontal adjustments needed to be made to the current location of the view of the user in order to view the active ROI.

Further, in one embodiment, the shape representing the ROI may be visually altered to indicate that that ROI is currently moving horizontally within the 360-degree video. For example, the geometric wedge may be skewed to indicate horizontal movement. In another example, a width of the geometric wedge may indicate horizontal bounds of movement of the ROI. In another embodiment, a plurality of ROIs may be presented to the user throughout the 360-degree video. Each of these ROIs may be the same color, a different color, etc.

Further still, at block 610, the visual guide is rendered in a display. In one embodiment, the display may include a display of the device being viewed by the user. In another embodiment, the device may include the client system 105 of FIG. 1.

In this way, spatiotemporal guidance may be provided to a user viewing a 360-degree video, where this guidance allows the user to anticipate regions of interest and adjust a location of their gaze so that they may view such regions of interest when the regions of interest are active within the 360-degree video. This spatiotemporal guidance may be presented utilizing a compact, minimalist display that may reduce an amount of processing and/or rendering necessary to be performed by a device to present such spatiotemporal information within the 360-degree video.

Figure 7:
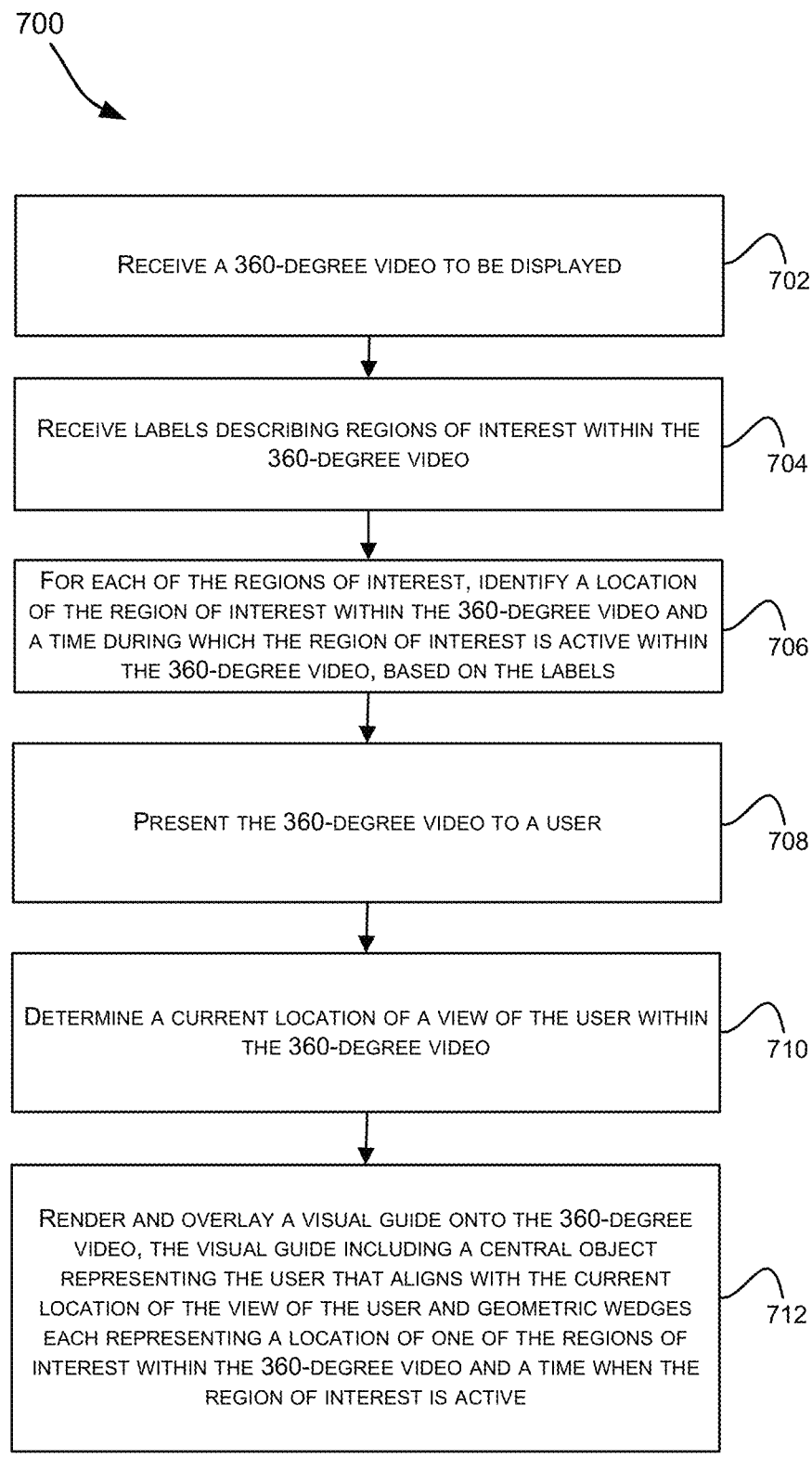
FIG. 7 is an illustration of a flowchart of an example process for providing a visual guide within 360-degree video in accordance with various embodiments.

FIG. 7 is an illustration of a flowchart of an example process 700 for providing a visual guide within 360-degree video. In some examples, the process is implemented by client system 105 described above, extended reality system 500 described above, or a portable electronic device, such as portable electronic device 1200 as shown in FIG. 12. The process 700 can be implemented in software or hardware or any combination thereof.

At block 702, a 360-degree video to be displayed is received. The 360-degree video may include a video recording where a view in every direction is recorded at the same time, shot using an omnidirectional camera or a collection of cameras. In one embodiment, the 360-degree video may be received at a client system (such as the client system 105 of FIG. 1) from another system (such as a remote system 115 of FIG. 1). In another embodiment, the entirety of the 360-degree video may be received at one time, or the 360-degree video may be received as a stream.

At block 704, labels describing regions of interest within the 360-degree video are received. In one embodiment, one or more of the labels may be received with the 360-degree video. In another embodiment, one or more of the labels may be created separately from the 360-degree video and may be received from a separate source from the 360-degree video. In yet another embodiment, after receiving the 360-degree video, the 360-degree video may be analyzed to determine one or more of the labels.

At block 706, for each of the regions of interest, a location of the region of interest within the 360-degree video is identified, as well as a time during which the region of interest is active within the 360-degree video, based on the labels.

At block 708, the 360-degree video is presented to a user. For example, the 360-degree video may be rendered and displayed on a display of the device being viewed by the user. This device may include the client system 105 of FIG. 1.

At block 710, a current location of a view of the user within the 360-degree video is determined. In one embodiment, the current location of the view of the user may be determined utilizing one or more sensors included within a device being viewed by the user. For example, the current location of the view of the user may be determined by identifying a positioning of the head of the user, a location of the eyes of the user, etc.

At block 712, a visual guide is rendered and overlaid onto the 360-degree video, the visual guide including a central object representing the user that aligns with the current location of the view of the user and geometric wedges each representing a location of one of the regions of interest within the 360-degree video and a time when the region of interest is active.

For example, for each of the displayed geometric wedges, a distance of the geometric wedge from a center of the central object (or a border of the central object representing the user) within the visual guide may correspond to a difference between a current time in the 360-degree video and a time in which the region of interest represented by that geometric wedge is active. Likewise, an angular location of the geometric wedge with respect to the central object may represent a spatial direction of the region of interest (e.g., in the yaw dimension) with respect to a current location of the view of the user.

In this way, by providing both spatial and temporal information about regions of interest within a 360-degree video, the visual guide may enable the user to anticipate a location and timing of such regions of interest and adjust their gaze so that they may clearly view regions of interest as the occur within the 360-degree video.

Example Visual Guide Features

Figure 8:
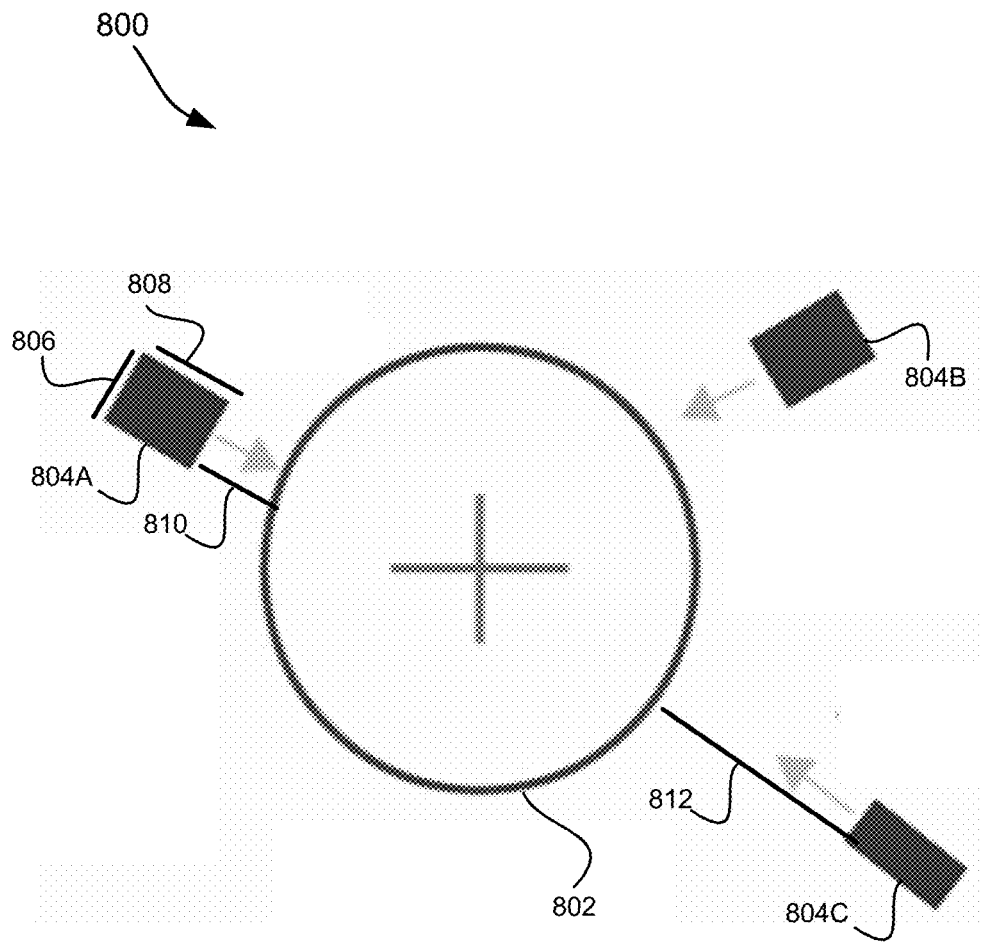
FIG. 8 is an illustration of exemplary visual guide in accordance with various embodiments.

FIG. 8 illustrates an exemplary visual guide 800, according to one exemplary embodiment. In one embodiment, the visual guide 800 may be overlaid onto a 360-degree video that is being played/presented to a user. In another embodiment, the visual guide 800 may indicate a location of multiple regions of interest within the 360-degree video with respect to a current location of the view of the user, and a time during which each region of interest is active within the 360-degree video.

For example, the visual guide 800 can be generated and rendered in a similar manner to a radar image that includes a central object 802 that represents a user (similar to the antenna in a radar image). The central object 802 can be aligned with a current location of the view of the user. For example, a top of the central object 802 may be aligned with a current location of the gaze. In some instances, the central object 802 is locked in place such that the current location of the view of the user is always illustrated at the top or north location of the central object 802. In other instances, the central object 802 is able to move/rotate such that the current location of the view of the user is illustrated at various locations of the central object 802 based on a given reference point. Additionally, the visual guide 800 includes multiple geometric wedges 804A-C surrounding the central object 802 (similar to the energy being reflected back to the antenna in the radar image). Each of the geometric wedges 804A-C represents a region of interest within the 360-degree video.

In one embodiment, for each of the geometric wedges 804A-C, a distance between the geometric wedge and the central object 802 corresponds to a difference between a current time in the 360-degree video and a time in which the region of interest represented by that geometric wedge is active. For example, a first distance 810 between a first geometric wedge 804A is smaller than a second distance 812 between a second geometric wedge 804C, which may indicate that the first geometric wedge 804A occurs before the second geometric wedge 804C within the 360-degree video.

Additionally, the width of each geometric wedge 804A-C may indicate horizontal bounds of movement of the region of interest represented by the geometric wedge 804A-C. For example, a first width 806 of the first geometric wedge 804A may indicate the horizontal bounds of movement of the region of interest represented by the first geometric wedge 804A. Further, the length of each geometric wedge 804A-C may indicate a duration of the region of interest represented by the geometric wedge 804A-C. For example, a first length 808 of the first geometric wedge 804A may indicate a duration of the region of interest represented by the first geometric wedge 804A.

Figure 9:
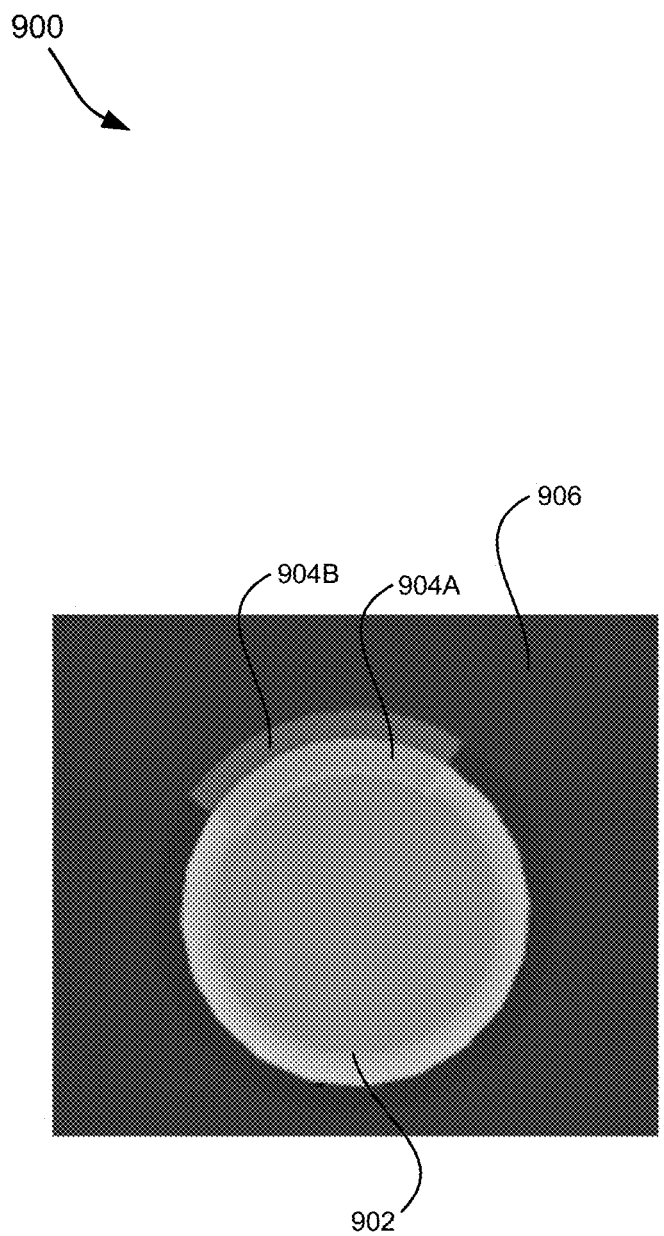
FIG. 9 is an illustration of exemplary features of a visual guide in accordance with various embodiments.

FIG. 9 illustrates exemplary features of a visual guide 900, according to one embodiment. As shown, a central object 902 is presented in the middle of the visual guide 900. As a first portion 904A of a geometric wedge currently intersects with the central object 902, its color and/or opacity changes to indicate that the region of interest represented by the first portion 904A is currently active and being viewed by the user within the 360-degree video. A second portion 904B of the geometric wedge has a different opacity from the first portion 904A to indicate that the region of interest represented by the second portion 904B is not yet active and being viewed by the user within the 360-degree video.

Additionally, a donut-shaped geometric shape 906 surrounding the central object 902 represents a region of interest that is present within the entirety of the 360-degree video and that occurs at a time corresponding to a distance between the donut-shaped geometric shape 906 and the central object 902.

Figure 10:
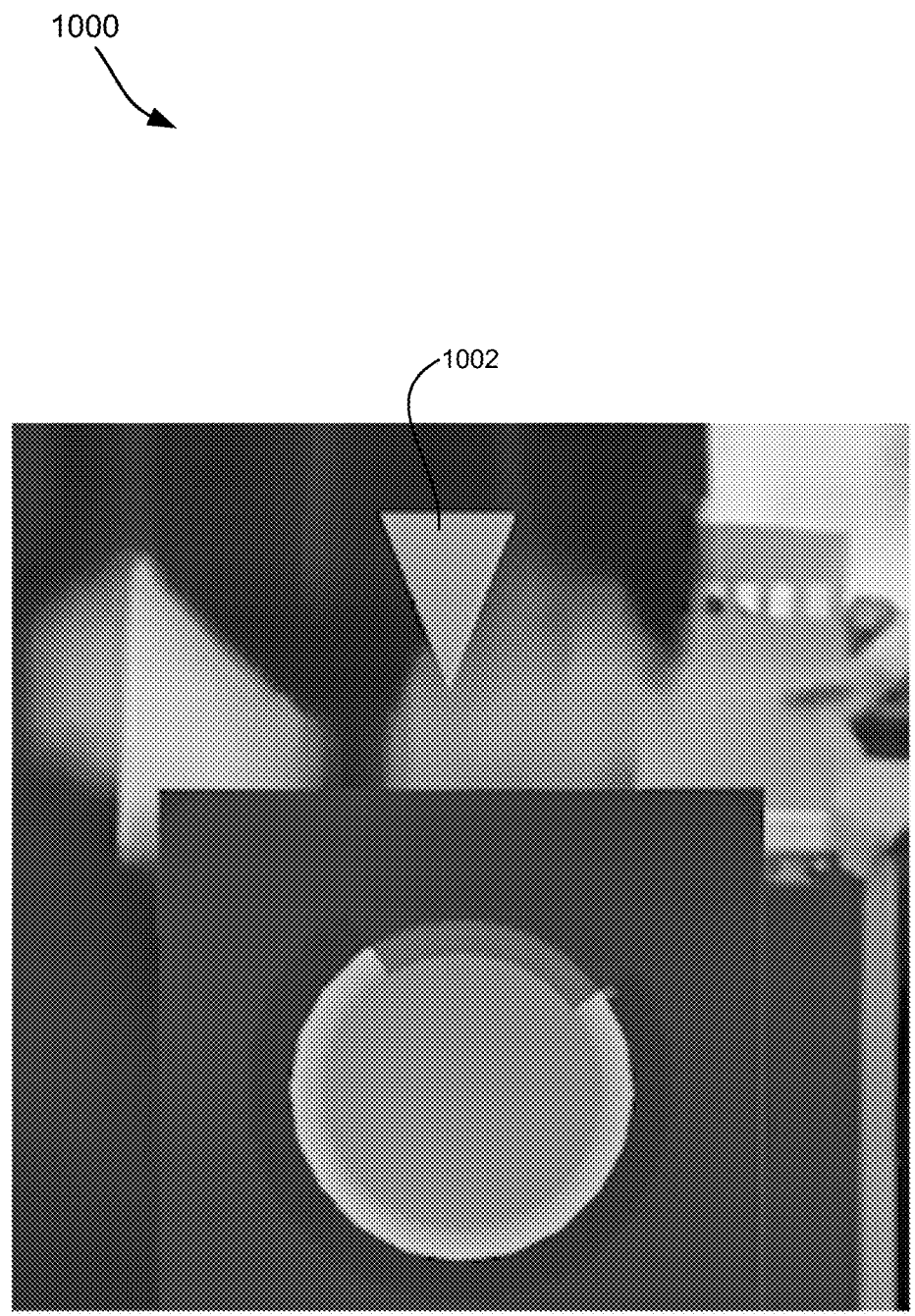
FIG. 10 is an illustration of an additional guidance feature of a visual guide in accordance with various embodiments.

FIG. 10 illustrates an additional guidance feature of a visual guide 1000, according to one embodiment. As shown, an indicator arrow 1002 is displayed within the visual guide 1000 to inform a user that a region of interest is currently active but is below a current a current location of the view of the user. In this way, a user may adjust their gaze (e.g., by looking down within the 360-degree video) to view the region of interest.

Figure 11:
FIG. 11 is an illustration of additional features of a visual guide that is overlaid onto a 360-degree video in accordance with various embodiments.

FIG. 11 illustrates additional features of a visual guide 1102 that is overlaid onto a 360-degree video 1104, according to one embodiment. As shown, a current view or attention of the user is locked as the top of the visual guide 1102 (such that a user can align their view with a given ROI). A first geometric wedge 1106 is shown in a first color to illustrate to the user that their current view is currently aligned with the region of interest represented by the first geometric wedge 1106. A second geometric wedge 1108 is shown in a second color different from the first color to illustrate to the user that their current view is not currently aligned with the region of interest represented by the second geometric wedge 1108.

Exploring Spatiotemporal Visual Guidance in 360-Degree Video

Viewers of 360-degree videos can only see a limited portion of the scene at any time. As a result, they may miss important events outside their field of view. Current techniques do not offer both spatial guidance (where to look) as well as temporal guidance (when to look). Temporal guidance offers viewers a look-ahead time and allows viewers to plan their head motion for important events. This helps viewers orient in both time and space to see short-duration ROIs and any associated entrance effects.

Spatiotemporal visual guidance may be provided via a widget which shows both spatial and temporal information of regions of interest (ROIs) in a video. The spatiotemporal feedback provided by the widget allows users to see a greater percentage of ROIs when compared to previous techniques.

Given pre-defined ROIs as input, the widget uses a visual guide including a radar visualization to represent a top-down view of the 360-degree scene and visualizes ROIs as moving wedges around a central object within the radar. The angular direction and radial distance of the wedges represent their location in space and time, respectively. As the video plays, the wedges move closer to the central object to indicate the passing of time. When a wedge reaches the central object, it indicates that the ROI is present and currently important. Using the visual guide, viewers can re-orient ahead of time to prepare for upcoming ROIs.

Using the visual guide, viewers have both spatial and temporal information of ROIs in the video, which allows them to look ahead at future ROIs and to plan their head motion in advance.

The widget takes as input a 360-degree video and a series of labeled ROIs. During video playback, the widget visualizes (via a visual guide) the ROIs around a central object overlaid over the video. In one embodiment, a labeled ROI consists of a bounding box and a start and end time. In another embodiment, ROIs are visualized as wedges that move towards a central object.

The design of the visual guide combines two concepts for spatiotemporal visualization. The angular direction of a wedge represents its spatial direction (in the yaw dimension), and its distance from the central object center represents its distance in time. As the video plays, the ROI wedges move towards the center of the central object at the same speed. When a wedge hits the circle, it indicates that the ROI is present and active, and the entire circle rim lights up to notify the viewer.

The visual guide is attached to a predetermined portion (such as the bottom) of the display and gives viewers a top-down overview of the 360-degree scene. This design compactly displays ROI information in one screen area and obviates the need to search for out-of-view ROIs, which could be cognitively demanding. To keep the ROI visualization simple, a simple wedge shape may be used to represent each ROI. The subtended angle of the wedge displays horizontal (yaw) direction of the ROI, and the radial thickness of the wedge represents its duration.

To show where other ROIs are relative to the viewer's current orientation and how far the viewer has to turn to see them, the visual guide always aligns with the viewer's orientation, i.e., the top of the visual guide always points towards the viewer's front-facing direction, and the bottom of the visual guide points refers to the direction behind the viewer (similar to a compass). As the viewer's head rotates, so do the wedges inside the visual guide.

To reduce the amount of spatial information displayed to the viewer the widget provides incremental spatial guidance. The widget may initially only display horizontal (yaw) spatial direction of ROIs on the visual guide. After the viewer orients to the correct horizontal direction, if the ROI is above or below the viewer's FOV, the widget may then display a green arrow to provide vertical guidance. For some 360-degree videos, however, objects of interest are on the ground plane, so an arrow may not be needed. Finally, the look-ahead time of ROIs may be limited (e.g., to ten seconds, etc.) to reduce the amount of temporal information shown.

Viewers may find it cognitively demanding to monitor streams of blocks. Therefore, the widget may reduce the visual saliency of wedges once an ROI is seen, and viewers no longer need to anticipate its arrival. Once the viewer sees an active ROI, the widget may mark the corresponding wedge as "hit" and may provide visual confirmation by changing its color (e.g., from blue to green) and making it very faint (i.e., by decreasing its opacity).

Some scenes may have more than one ROI at the same time, in which case the widget may show multiple wedges hitting the central object simultaneously. In other scenes, all directions may be equally important. For example, a narrator might generally describe the interior decorations of a building. To take these cases into account, the widget may also accepts all-directional ROI labels and may visualize them as donuts around the central object.

Illustrative Device

FIG. 12 is an illustration of a portable electronic device 1200. The portable electronic device 1200 may be implemented in various configurations in order to provide various functionalities to a user. For example, the portable electronic device 1200 may be implemented as a wearable device (e.g., a head-mounted device, smart eyeglasses, smart watch, and smart clothing), communication device (e.g., a smart, cellular, mobile, wireless, portable, and/or radio telephone), home management device (e.g., a home automation controller, smart home controlling device, and smart appliances), a vehicular device (e.g., autonomous vehicle), and/or computing device (e.g., a tablet, phablet, notebook, and laptop computer; and a personal digital assistant). The foregoing implementations are not intended to be limiting and the portable electronic device 1200 may be implemented as any kind of electronic or computing device that is configured to provide an extended reality system and predict routines using a part of all of the methods disclosed herein.

The portable electronic device 1200 includes processing system 1208, which includes one or more memories 1210, one or more processors 1212, and RAM 1214. The one or more processors 1212 can read one or more programs from the one or more memories 1210 and execute them using RAM 1214. The one or more processors 1212 may be of any type including but not limited to a microprocessor, a microcontroller, a graphical processing unit, a digital signal processor, an ASIC, a FPGA, or any combination thereof. In some embodiments, the one or more processors 1212 may include a plurality of cores, one or more coprocessors, and/or one or more layers of local cache memory. The one or more processors 1212 can execute the one or more programs stored in the one or more memories 1210 to perform operations as described herein including those described with respect to FIG. 1-11.

The one or more memories 1210 can be non-volatile and may include any type of memory device that retains stored information when powered off. Non-limiting examples of memory include electrically erasable and programmable read-only memory (EEPROM), flash memory, or any other type of non-volatile memory. At least one memory of the one or more memories 1210 can include a non-transitory computer-readable storage medium from which the one or more processors 1212 can read instructions. A computer-readable storage medium can include electronic, optical, magnetic, or other storage devices capable of providing the one or more processors 1212 with computer-readable instructions or other program code. Non-limiting examples of a computer-readable storage medium include magnetic disks, memory chips, read-only memory (ROM), RAM, an ASIC, a configured processor, optical storage, or any other medium from which a computer processor can read the instructions.

The portable electronic device 1200 also includes one or more storage devices 1218 configured to store data received by and/or generated by the portable electronic device 1200. The one or more storage devices 1218 may be removable storage devices, non-removable storage devices, or a combination thereof. Examples of removable storage and non-removable storage devices include magnetic disk devices such as flexible disk drives and HDDs, optical disk drives such as compact disk (CD) drives or digital versatile disk (DVD) drives, SSDs, and tape drives.

The portable electronic device 1200 may also include other components that provide additional functionality. For example, camera circuitry 1202 may be configured to capture images and video of a surrounding environment of the portable electronic device 1200. Examples of camera circuitry 1202 include digital or electronic cameras, light field cameras, 3D cameras, image sensors, imaging arrays, and the like. Similarly, audio circuitry 1222 may be configured to record sounds from a surrounding environment of the portable electronic device 1200 and output sounds to a user of the portable electronic device 1200. Examples of audio circuitry 1222 include microphones, speakers, and other audio/sound transducers for receiving and outputting audio signals and other sounds. Display circuitry 1206 may be configured to display images, video, and other content to a user of the portable electronic device 1200 and receive input from the user of the portable electronic device 1200. Examples of the display circuitry 1206 may include an LCD, an LED display, an OLED screen, and a touchscreen display. Communications circuitry 1204 may be configured to enable the portable electronic device 1200 to communicate with various wired or wireless networks and other systems and devices. Examples of communications circuitry 1204 include wireless communication modules and chips, wired communication modules and chips, chips for communicating over local area networks, wide area networks, cellular networks, satellite networks, fiber optic networks, and the like, systems on chips, and other circuitry that enables the portable electronic device 1200 to send and receive data. Orientation detection circuitry 1220 may be configured to determine an orientation and a posture for the portable electronic device 1200 and/or a user of the portable electronic device 1200. Examples of orientation detection circuitry 1220 include GPS receivers, ultra-wideband (UWB) positioning devices, accelerometers, gyroscopes, motion sensors, tilt sensors, inclinometers, angular velocity sensors, gravity sensors, and inertial measurement units. Haptic circuitry 1226 may be configured to provide haptic feedback to and receive haptic feedback from a user of the portable electronic device 1200. Examples of haptic circuitry 1226 include vibrators, actuators, haptic feedback devices, and other devices that generate vibrations and provide other haptic feedback to a user of the portable electronic device 1200. Power circuitry 1224 may be configured to provide power to the portable electronic device 1200. Examples of power circuitry 1224 include batteries, power supplies, charging circuits, solar panels, and other devices configured to receive power from a source external to the portable electronic device 1200 and power the portable electronic device 1200 with the received power.

The portable electronic device 1200 may also include other I/O components. Examples of such input components can include a mouse, a keyboard, a trackball, a touch pad, a touchscreen display, a stylus, data gloves, and the like. Examples of such output components can include holographic displays, 3D displays, projectors, and the like.

ADDITIONAL CONSIDERATIONS

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. An extended reality headset comprising:
a display configured to display content to a user;
one or more sensors configured to capture input data; and
one or more processors configured to:
cause identification of a location of a region of interest within a 360-degree video;
cause identification of a time during which the region of interest is active within the 360-degree video;
receive information used to present a visual guide, the visual guide including one or more visual indicators indicating:
the location of the region of interest within the 360-degree video with respect to a user's current view;
the time during which the region of interest is active within the 360-degree video; and
wherein the visual guide includes one or more additional visual indicators in accordance with a determination that the region of interest is active and the user's current view does not enable the region of interest to be viewed; and
cause output of the visual guide at the display.

2. The extended reality headset of claim 1, wherein the one or more processors are configured to determine the user's current view within a 360-degree video based on the input data, utilizing the one or more sensors within the extended reality headset.

3. The extended reality headset of claim 1, wherein the one or more processors are configured to receive a label for the region of interest, the label including:
a bounding box indicating the location of the region of interest within the 360-degree video, and
a start time and an end time for the region of interest within the 360-degree video.

4. The extended reality headset of claim 1, wherein the visual guide includes a visual widget that represents a top-down overview of the 360-degree video.

5. The extended reality headset of claim 1, wherein;
the visual guide includes a first shape representing the user; and
the first shape aligns with the user's current view.

6. The extended reality headset of claim 5, wherein:
the visual guide includes a second shape representing the region of interest; and
a distance of the second shape from the first shape corresponds to a difference between a current time in the 360-degree video and a time in which the region of interest is active.

7. The extended reality headset of claim 1, wherein:
the visual guide includes a central object that aligns with the user's current view;
the region of interest is displayed as a geometric shape positioned around the central object
the location of the region of interest with respect to the user's current view corresponds to an angular location of the geometric shape with respect to the central object;
the time during which the region of interest is active within the 360-degree video corresponds to a distance of the geometric shape from a center of the central object;
a decrease in the distance between the geometric shape and the center of the central object signifies a decrease in a time until the region of interest is active within the 360-degree video;
a duration of the region of interest within the 360-degree video is represented by a radial thickness of the geometric shape; or
the geometric shape intersects with the central object when the region of interest is active within the 360-degree video.

8. The extended reality headset of claim 7, wherein the one or more processors are configured to:
alter one or more characteristics of the central object in response to determining that:
the region of interest is active, and
the user's current view does not enable the region of interest to be viewed;
alter a shape of the geometric shape in response to determining that the region of interest is currently moving horizontally within the 360-degree video; or
alter one or more characteristics of the geometric shape in response to determining that the region of interest is active and the user's current view enables the region of interest to be viewed.

9. A method comprising:
identifying a location of a region of interest within a 360-degree video;
identifying a time during which the region of interest is active within the 360-degree video;
generating a visual guide, the visual guide including one or more visual indicators indicating:
the location of the region of interest within the 360-degree video with respect to a user's current view;
the time during which the region of interest is active within the 360-degree video; and
wherein the visual guide includes one or more additional visual indicators in accordance with a determination that the region of interest is active and the user's current view does not enable the region of interest to be viewed; and
outputting the visual guide at a display.

10. The method of claim 9, comprising determining the user's current view within a 360-degree video based on input data, utilizing one or more sensors within a head-mounted device.

11. The method of claim 9, comprising receiving a label for the region of interest, the label including:
a bounding box indicating the location of the region of interest within the 360-degree video, and
a start time and an end time for the region of interest within the 360-degree video.

12. The method of claim 9, wherein:
the visual guide includes:
- a first shape representing a user; and
- a second shape representing the region of interest, wherein a distance of the second shape from the first shape corresponds to a difference between a current time in the 360-degree video and a time in which the region of interest is active; and the first shape aligns with the user's current view.

13. The method of claim 9, wherein:
the visual guide includes a central object that aligns with the user's current view;
the region of interest is displayed as a geometric shape positioned around the central object
the location of the region of interest with respect to the user's current view corresponds to an angular location of the geometric shape with respect to the central object;
the time during which the region of interest is active within the 360-degree video corresponds to a distance of the geometric shape from a center of the central object;
a decrease in the distance between the geometric shape and the center of the central object signifies a decrease in a time until the region of interest is active within the 360-degree video;
a duration of the region of interest within the 360-degree video is represented by a radial thickness of the geometric shape; or
the geometric shape intersects with the central object when the region of interest is active within the 360-degree video.

14. The method of claim 13, comprising:
altering one or more characteristics of the central object in response to determining that:
   the region of interest is active, and
   the user's current view does not enable the region of interest to be viewed;
altering a shape of the geometric shape in response to determining that the region of interest is currently moving horizontally within the 360-degree video; or
altering one or more characteristics of the geometric shape in response to determining that the region of interest is active and the user's current view enables the region of interest to be viewed.

15. One or more non-transitory computer-readable media storing computer-readable instructions that, when executed by one or more processing systems, cause the one or more processing systems to perform operations including:
identifying a location of a region of interest (ROI) within a 360-degree video;
identifying a time during which the region of interest is active within the 360-degree video;
generating a visual guide, the visual guide including one or more visual indicators indicating:
   the location of the region of interest within the 360-degree video with respect to a user's current view;
   the time during which the region of interest is active within the 360-degree video; and
   wherein the visual guide includes one or more additional visual indicators in accordance with a determination that the region of interest is active and the user's current view does not enable the region of interest to be viewed; and
outputting the visual guide at a display.

16. The one or more non-transitory computer-readable media of claim 15, wherein the operations include:
determining the user's current view within a 360-degree video based on input data, utilizing one or more sensors within a head-mounted device.

17. The one or more non-transitory computer-readable media of claim 15, wherein the operations include receiving a label for the region of interest, the label including:
- a bounding box indicating the location of the region of interest within the 360-degree video, and
- a start time and an end time for the region of interest within the 360-degree video.

18. The one or more non-transitory computer-readable media of claim 15, wherein:
the visual guide includes:
- a first shape representing a user; and
- a second shape representing the region of interest, wherein a distance of the second shape from the first shape corresponds to a difference between a current time in the 360-degree video and a time in which the region of interest is active; and the first shape aligns with the user's current view.

19. The one or more non-transitory computer-readable media of claim 15, wherein:
the visual guide includes a central object that aligns with the user's current view;
the region of interest is displayed as a geometric shape positioned around the central object
the location of the region of interest with respect to the user's current view corresponds to an angular location of the geometric shape with respect to the central object;
the time during which the region of interest is active within the 360-degree video corresponds to a distance of the geometric shape from a center of the central object;
a decrease in the distance between the geometric shape and the center of the central object signifies a decrease in a time until the region of interest is active within the 360-degree video;
a duration of the region of interest within the 360-degree video is represented by a radial thickness of the geometric shape; or
the geometric shape intersects with the central object when the region of interest is active within the 360-degree video.

20. The one or more non-transitory computer-readable media of claim 19, wherein the operations include:
altering one or more characteristics of the central object in response to determining that:
   the region of interest is active, and
   the user's current view does not enable the region of interest to be viewed;
altering a shape of the geometric shape in response to determining that the region of interest is currently moving horizontally within the 360-degree video; or
altering one or more characteristics of the geometric shape in response to determining that the region of interest is active and the user's current view enables the region of interest to be viewed.

* * * * *